US008037407B2

(12) United States Patent
Ahlert et al.

(10) Patent No.: US 8,037,407 B2
(45) Date of Patent: Oct. 11, 2011

(54) METHOD AND COMPUTER SYSTEM FOR CREATING AND PROCESSING A BROWSER COMPLIANT HUMAN INTERFACE DESCRIPTION

(75) Inventors: Dirk Ahlert, Mühlhausen (DE); Wolfgang Koch, Dielheim (DE); Gunther Liebich, Walldorf (DE)

(73) Assignee: SAP AG, Walldorf (DE)

( * ) Notice: Subject to any disclaimer, the term of this patent is extended or adjusted under 35 U.S.C. 154(b) by 512 days.

(21) Appl. No.: 10/484,880

(22) PCT Filed: Apr. 16, 2002

(86) PCT No.: PCT/EP02/04209
§ 371 (c)(1),
(2), (4) Date: Jul. 30, 2004

(87) PCT Pub. No.: WO03/012634
PCT Pub. Date: Feb. 13, 2003

(65) Prior Publication Data
US 2004/0249487 A1 Dec. 9, 2004

(30) Foreign Application Priority Data
Jul. 27, 2001 (EP) .................................. 01118306

(51) Int. Cl.
*G06F 17/00* (2006.01)

(52) U.S. Cl. ....................................... 715/236; 715/243

(58) Field of Classification Search .................. 715/523, 715/517, 249, 243, 235–236; 700/83, 17
See application file for complete search history.

(56) References Cited

U.S. PATENT DOCUMENTS

| 5,860,073 A | 1/1999 | Ferrel et al. |
| 5,944,781 A | 8/1999 | Murray |
| 5,995,985 A | 11/1999 | Cai |
| 6,023,714 A | 2/2000 | Hill et al. |
| 6,083,276 A | 7/2000 | Davidson et al. |

(Continued)

FOREIGN PATENT DOCUMENTS

EP 0 812 088 A2 12/1997

(Continued)

OTHER PUBLICATIONS

Phanouriou, UIML:A Device-Independent User Interface Markup Language, Sep. 26, 2006, pp. 1-161.*

(Continued)

*Primary Examiner* — Stephen Hong
*Assistant Examiner* — Manglesh Patel
(74) *Attorney, Agent, or Firm* — Finnegan, Henderson, Farabow, Garrett & Dunner LLP

(57) ABSTRACT

Computer-implemented methods, computer systems and computer program products are provided for creating and processing a browser compliant human interface description. A predefined application specific human interface description using application specific layout elements is transformed into a standardized human interface description using basic layout elements. The standardized human interface description is decomposed into a human interface layout template and a data description. A data instance is instantiated from the data description. The data instance is merged with the human interface layout template into an individual browser compliant human interface description, which is then rendered to prompt a user for data input. The received data from the user are stored in the data instance. The status of at least one layout element is either stored in the data instance or in a runtime-copy of the standardized human interface description.

27 Claims, 8 Drawing Sheets

U.S. PATENT DOCUMENTS

| | | |
|---|---|---|
| 6,192,380 B1 | 2/2001 | Light et al. |
| 6,212,534 B1 | 4/2001 | Lo et al. |
| 6,226,632 B1 | 5/2001 | Takahashi et al. |
| 6,279,015 B1* | 8/2001 | Fong et al. ............. 715/523 |
| 6,429,882 B1 | 8/2002 | Abdelnur et al. |
| 6,516,349 B1 | 2/2003 | Lieberman |
| 6,582,474 B2 | 6/2003 | LaMarca et al. |
| 6,589,290 B1 | 7/2003 | Maxwell et al. |
| 6,603,489 B1 | 8/2003 | Edlund et al. |
| 6,651,217 B1 | 11/2003 | Kennedy et al. |
| 6,701,308 B1 | 3/2004 | Chen et al. |
| 6,701,486 B1 | 3/2004 | Weber et al. |
| 6,801,224 B1* | 10/2004 | Lewallen ............. 715/746 |
| 6,922,810 B1 | 7/2005 | Trower, II et al. |
| 6,928,623 B1 | 8/2005 | Sibert |
| 6,941,510 B1 | 9/2005 | Ozzie et al. |
| 6,968,503 B1* | 11/2005 | Chang et al. ............. 715/526 |
| 6,981,028 B1 | 12/2005 | Rawat et al. |
| 7,016,977 B1 | 3/2006 | Dunsmoir et al. |
| 7,039,863 B1 | 5/2006 | Caro et al. |
| 7,058,886 B1 | 6/2006 | Sulistio et al. |
| 7,117,429 B2 | 10/2006 | Vedullapalli et al. |
| 7,143,359 B2 | 11/2006 | Aggarwal et al. |
| 7,194,680 B1 | 3/2007 | Roy et al. |
| 7,222,087 B1 | 5/2007 | Bezos et al. |
| 7,234,105 B2 | 6/2007 | Bezrukov et al. |
| 7,324,983 B1 | 1/2008 | Morris et al. |
| 7,392,468 B2 | 6/2008 | Igata et al. |
| 2001/0014900 A1 | 8/2001 | Brauer et al. |
| 2001/0056460 A1* | 12/2001 | Sahota et al. ............. 709/201 |
| 2002/0054081 A1* | 5/2002 | Mimoun ............. 345/738 |
| 2002/0077846 A1 | 6/2002 | Bierbrauer et al. |
| 2002/0093530 A1 | 7/2002 | Krothapalli et al. |
| 2002/0111963 A1 | 8/2002 | Gebert et al. |
| 2003/0014442 A1 | 1/2003 | Shiigi et al. |
| 2004/0003341 A1 | 1/2004 | alSafadi et al. |
| 2004/0039988 A1 | 2/2004 | Lee et al. |
| 2004/0083453 A1 | 4/2004 | Knight et al. |
| 2004/0205530 A1 | 10/2004 | Borg |
| 2004/0249486 A1 | 12/2004 | Ahlert et al. |
| 2005/0034066 A1 | 2/2005 | Ahlert et al. |
| 2005/0120043 A1* | 6/2005 | Lee et al. ............. 707/102 |
| 2006/0224397 A1 | 10/2006 | Morris et al. |
| 2007/0186150 A1 | 8/2007 | Rao et al. |

FOREIGN PATENT DOCUMENTS

| | | |
|---|---|---|
| EP | 1100013 | 5/2001 |
| JP | 2001-143006 | 5/2001 |
| JP | 2002-526862 | 8/2002 |
| WO | WO 99/17193 | 4/1999 |
| WO | WO 99/63473 | 12/1999 |
| WO | WO 00/020985 | 4/2000 |
| WO | WO 00/34860 | 6/2000 |
| WO | WO 0033535 | 6/2000 |
| WO | WO 00/52596 | 9/2000 |
| WO | WO 0052564 | 9/2000 |
| WO | WO 0072197 | 11/2000 |
| WO | WO 0118630 | 3/2001 |
| WO | WO 01/29636 | 4/2001 |

OTHER PUBLICATIONS

Dubinko et al., XForms 1.0, Feb. 2001, W3C, Draft 16, Feb. 2001, pp. 1-179.*

Holman, What is XSLT, Aug. 16, 2000, XML.com, pp. 1-46.*

Holzner et al., XML to XHTML Transformations with XSLT Processors, Jun. 22, 2001, pp. 1-4.*

Dubinko et al. (NPL—Xforms 1.0, Feb. 2001, W3C, pp. 1-179).*

"XSL Transformations (XSLT)," W3C Recommendation, Online, Nov. 16, 1999, XP002189938, retrieved from the Internet,<URL:http://www.W3.org/TR/xslt>retrieved on Feb. 11, 2002, paragraphs '0001 and '0002, pp. 1-102.

Khare, "Can Xform Transform the Web?" Mar. 9, 2000, Seventh Heaven, pp. 1-12.

"XSL Transformations (XSLT), Version 1.0, W3C Recommendation, Nov. 16, 1999," retrieved from the Internet: http://www.w3.org/TR/REC-xlst-19991116, Sections 1-2.7 (10 pages).

Dubinko et al., "Xforms 1.0 W3C Working Draft 08," retrieved from the Internet: http://www.w3.org/TR/2001/WD-xforms-20010608, Jun. 2001, pp. 1-65.

Dubinko et al., "Xforms 1.0, W3C Working Draft, Feb. 16, 2001," retrieved from the Internet: http://www.w3.org/TR/2001/WD-xforms/20010216, pp. 1-80, and Appendix B, pp. 1-60.

European Office Action dated Feb. 2, 2008, in Application No. EP 01118304, 3 pages.

Goeschka K. M. et al., "Client and Legacy Integration in Object-Oriented Web Engineering," IEEE Multimedia, vol. 8, No. 1, Mar. 2001, pp. 32-41.

Meyer T. et al., "WAXweb: a MOO-based collaborative hypermedia system for WWW," 1995, pp. 77-84.

Japanese Office Action dated Oct. 15, 2010 (3 pages) and translation thereof (4 pages) for Japanese Application No. 2008-101949.

* cited by examiner

METHOD AND COMPUTER SYSTEM FOR CREATING AND PROCESSING A BROWSER COMPLIANT HUMAN INTERFACE DESCRIPTION

This application is a national stage filing under 35 U.S.C. §371 of International Application No. PCT/EP02/04209, filed Apr. 16, 2002, which published in the English language.

FIELD OF THE INVENTION

The present invention generally relates to a human interface of a data processing system, and more particularly relates to computer-implemented methods and computer systems to interact with a computer through automatically created human interfaces.

BACKGROUND OF THE INVENTION

In prior art systems, human interfaces are described with a standardized human interface description language (SIDL). The term "human interface" as used hereinafter, describes any kind of application interface for a human to interact with application programs that run on a computer. Examples for human interfaces are graphical user interfaces (GUI) or voice user interfaces (VUI).

Typically the SIDL is a "Extensible Markup Language" (XML) based language that provides a set of layout components. A layout component comprises description instructions that describe a specific element of the human interface. These description instructions are called layout element, hereinafter. A transformer program, comprising transformation rules, transforms the layout element into a browser compliant description.

A browser, as used hereinafter, is a computer program that"renders" a document which is written in a markup language, such as "Hyper. Text Markup Language" (HTML), "Wireless Markup Language" (WML) or "Voice Extensible Markup Language" (VXML), into a visual or audio presentation of this document. A browser can be device specific. For example, a browser that renders a HTML document on a personal computer screen differs from a browser that renders a WML document on a wireless application protocol (WAP) cell phone display.

The browser compliant description can be rendered by a conventional browser into corresponding visual or audio layout elements on an output device of a computer as part of the human interface. In a SIDL, the layout elements typically have a an application independent character, such as "row," "cell," "table," "grid," etc. As used hereinafter, such layout elements are called basic layout elements. Basic layout elements can be reused in any context of any application.

However, an application programmer, who wants to create an application specific human interface, desires to describe this human interface by using descriptive terms that are known in the field of the application. The term "application programmer," as used hereinafter, also comprises users that create human interfaces. For example, a controller of a company can become an "application programmer" when designing an human interface to capture planning data for the next fiscal year from other managers in the company. For example, when describing a survey interface, it is convenient to describe the structure of the human interface by using terms like "questionnaire" or "question" instead of the previously listed application independent terms. When adding application specific layout elements to a SIDL, the SIDL can become confusing. Many different layout elements result in similar or equal visual layout elements, thus overloading the standardized SIDL through redundant application specific layout elements. This redundancy impedes the application programmer in efficiently identifying an appropriate layout element from an ever growing list of layout elements. Further, the transformer program has to be adjusted each time, when a new layout element is added, because a transformation rule for the new layout element has to be added. This is an inconvenient procedure for the SIDL because a standard should not be changed frequently.

Further; in the XForms 1.0 specification (8 Jun. 2001) of the World Wide Web Consortium (W3C), the assumption is made that data information and layout information are separated throughout the whole human interface design process. This requires the exact knowledge of the data model that is used in an application. Data model, as used hereinafter, corresponds to a data description of data that are used (displayed, played, captured, etc.) by the human interface. However, there are applications where the data model of the application is not known when the human interface design starts. For example, when an application programmer builds a survey application, typically, the information that is to be captured through a survey form (questionnaire) is defined while developing the survey. Input fields are added to the form as they are defined during the design process. In general, no data model exists that describes the corresponding data (e.g. dependencies between data, such as the grouping of multiple questions into a question group).

Further, for example, when a user interacts with a web application (e.g. user submits data) through a human interface, the human interface typically is re-rendered in its initial state. Often the layout status of the human interface before the interaction is lost because the application does not memorize it.

SUMMARY OF THE INVENTION

Hence, the present invention provides methods, computer systems and computer program products to solve the technical problem of providing application specific layout elements and automatically transforming them via standardized basic layout elements into a browser compliant description language without modifying the standardized basic layout elements.

For convenience of explanation and without the intention of limiting embodiments of the present invention, in the following description of the present invention it is assumed that the human interface is a graphical user-interface. However, the term "layout element," as used hereinafter to describe a graphical layout element, also has a meaning in a voice human interface, where it corresponds to a sequence of sounds (e.g., spoken words) that follows a specific dialogue (interaction) schema.

A solution to the technical problem according to a an embodiment of the present invention may be provided by the following characteristics:

a) a predefined application specific human interface description may comprise a plurality of application specific layout elements;

b) a computer system may transform the application specific human interface description into a standardized human interface description comprising a plurality of basic layout element; and c) the computer system may convert the standardized human interface description into a browser compliant human interface description.

It is an advantage of the present invention that an application programmer gets better control of the application human interface development tools of a computer system. The application specific layout elements (ASLE) typically have a higher degree of abstraction than the basic layout elements (BLE) of the standardized SIDL. This supports the process of efficient application specific human interface development because the application programmer can use a smaller number of layout elements that are specifically designed for the application. By automating the transformation of an application specific interface description language (AIDL) into a browser compliant description language (e.g. HTML) of the human interface via a SIDL, the SIDL is not modified. The SIDL is a standardized, application independent and browser independent format to describe the human interface. Preferably the automation is achieved by using a style sheet language transformation, such as "Extensible Style sheet Language Transformation" (XSLT). XSLT is a language to transform XML documents into other XML documents. An XSLT processor reads a first XML document and follows the instructions in a XSL style sheet, then it outputs a second XML document or XML-document fragment.

It is a further advantage of the present invention that the automatically created browser compliant description of the human interface is editable for layout before layout information is separated from data information. This allows an application programmer to use standard web authoring tools to refine the automatically created browser compliant description of the human interface.

Further the present invention solves the technical problem of automatically separating data information from layout information on the basis of a document where layout information and data information is mixed.

The solution to the technical problem according to the first preferred embodiment of the present invention is provided by the following characteristics:

d) The computer system decomposes the browser compliant human interface description into a human interface layout template and a data description.

It is an advantage of the present invention that the inventive computer system automatically creates a data model for an application that initially lacks a data model. This is the case when the application is defined through an human interface description that includes both data and layout information. Examples of this kind of applications, that is, information-gathering applications, are survey forms or forms for service requests. Survey forms may comprise input or answer fields that are defined during the survey design process and where no predefined data description exists. Service requests also may comprise fields that are not predefined. For example, if a service is not used very often, a predefined data description for that service may not exist.

Further, the present invention solves the technical problem to prompt a user with an human interface after an interaction of the user with the computer, wherein the human interface "remembers" its status of before the interaction. "Remember" in this context is used to describe the ability of the inventive computer system to keep the status of a layout element, such as the expansion status of a hierarchy.

A solution to the technical problem according to an embodiment of the present invention may be provided by the following characteristics: The computer system e) instantiates a data instance from the data description;

f) merges the data instance with the human interface layout template into an individual browser compliant human interface description;

g) renders the individual browser compliant human interface description to prompt an user for data input;

h) receives data from the user;

i) stores the data in the data instance; and j) stores a status of at least one layout element.

Therefore, it is a further advantage of the present invention that the user, upon inputting data through the human interface and submitting the data, is prompted with an human interface that shows the same status as before the data submission occurred. For example, when the user has expanded a hierarchy to input data that relate to a certain node of the hierarchy, the expansion status of the hierarchy after data submission may remain the same as of before data submission. In one embodiment, the above-described characteristics a) to d) may be processed at design-time, whereas characteristics e) to j) may be processed at runtime of the computer system. Runtime, as used hereinafter, means: occurring while the human interface is executing (being used interactively by a user). Design-time means: occurring while the human interface is designed (before being used interactively).

In another embodiment of the present invention, characteristics c) and d) may be replaced by the following characteristic:

k) the computer system decomposes the standardized human interface description into, a human interface layout template and a data description.

An advantage is the full automation of the creation of the individual browser compliant human interface description when starting with the application specific human interface description. Because no user interaction occurs during the individual browser compliant human interface creation, the second preferred embodiment may allow an extension of runtime processing to comprise characteristics e) to j) and k). Characteristics c) and d) in the first embodiment may be executed at design-time.

At any place in the description of the present invention where a style sheet language transformation, such as XSLT, is used to define transformation or conversion rules, alternatively, a person of skill in the art can implement these rules in any programming language, such as Java, as well.

The aspects of the invention will be realized and attained by means of the elements and combinations particularly pointed out in the appended claims. It is to be understood that both, the foregoing general description and the following detailed description are exemplary and explanatory only and are not restrictive of the invention as described.

DETAILED DESCRIPTION

Wherever possible, the same reference numbers will be used throughout the drawings to refer to the same or like parts. For convenience of explanation the reference number table at the end or the description lists the most important reference numbers and their descriptions.

Figure 1:
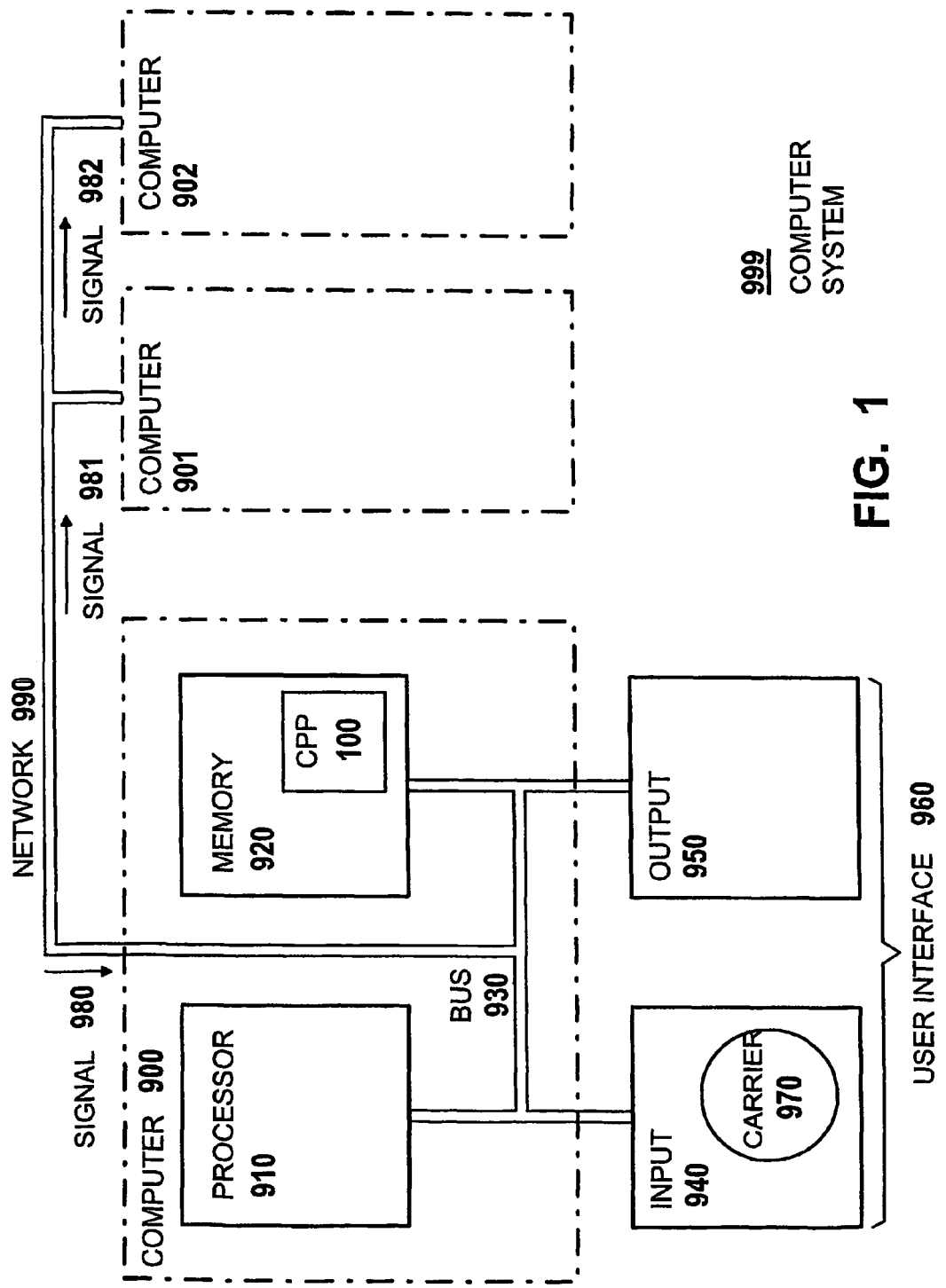
FIG. 1 illustrates a block diagram of an exemplary implementation of the inventive computer network system.

FIG. 1 illustrates a block diagram of an exemplary implementation of the inventive computer network system 999 having a plurality of computers 900, 901, 902 (or 90$q$, with $q=0 \ldots Q-1$, Q any number).

Computers 900-902 are coupled via inter-computer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program."

In respect to computer 900, computer 901/902 is sometimes referred to as "remote computer," computer 901/902 is, for example, a server, a router, a peer device or other common network node, and typically comprises many or all of the elements described relative to computer 900. Hence, elements 100 and 910-980 in computer 900 collectively illustrate also corresponding elements 10$q$ and 91$q$-98$q$ (shown for $q=0$) in computers 90$q$.

Computer 900 is, for example, a conventional personal computer (PC), a desktop and hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as; for example: (a) magnetic media, like a hard disk, a floppy disk, or other magnetic disk, a tape, a cassette tape; (b) optical media, like optical disk (CD-ROM, digital versatile disk DVD); (c) semiconductor media, like DRAM, SRAM, EPROM, EEPROM, memory stick, or by any other media, like paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Signal 980 travels on network 990 to computer 900.

Having described CPP 100, program carrier 970, and program signal 980 in connection with computer 900 is convenient.

Input device 940 symbolizes a device that provides data and instructions for processing by computer 900. For example, device 940 is a keyboard, a pointing device (e.g., mouse, trackball; cursor direction keys), microphone, joystick, game pad, scanner. Although the examples are devices with human interaction, device 940 can also operate without human interaction; such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or a display, (cathode ray tube (CRT), flat panel display, liquid crystal display (LCD), speaker, printer, plotter, vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930," connections between computers 900-902 are referred to as "network 990." Optionally, network 990 comprises gateways being computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e., world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN), an Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are known, for example, as transmission control protocol/internet protocol (TCP/IP), hyper text transfer protocol (HTTP), secure HTTP, wireless application protocol, unique resource locator (URL), a unique resource identifier (URI), hyper text markup language (HTML), extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computers and programs are closely related. As used hereinafter, phrases, such as "the computer provides" and "the program provides," are convenient abbreviations to express actions by a computer that may be controlled by a program. Furthermore, the term "preferably" is nonexclusive and means "preferably, but not limited to."

It is not important for the present invention, where computer programs, files or documents are stored in computer system 999. For convenience of explanation, they are stored in memory 920 of computer 900.

Figure 2A:
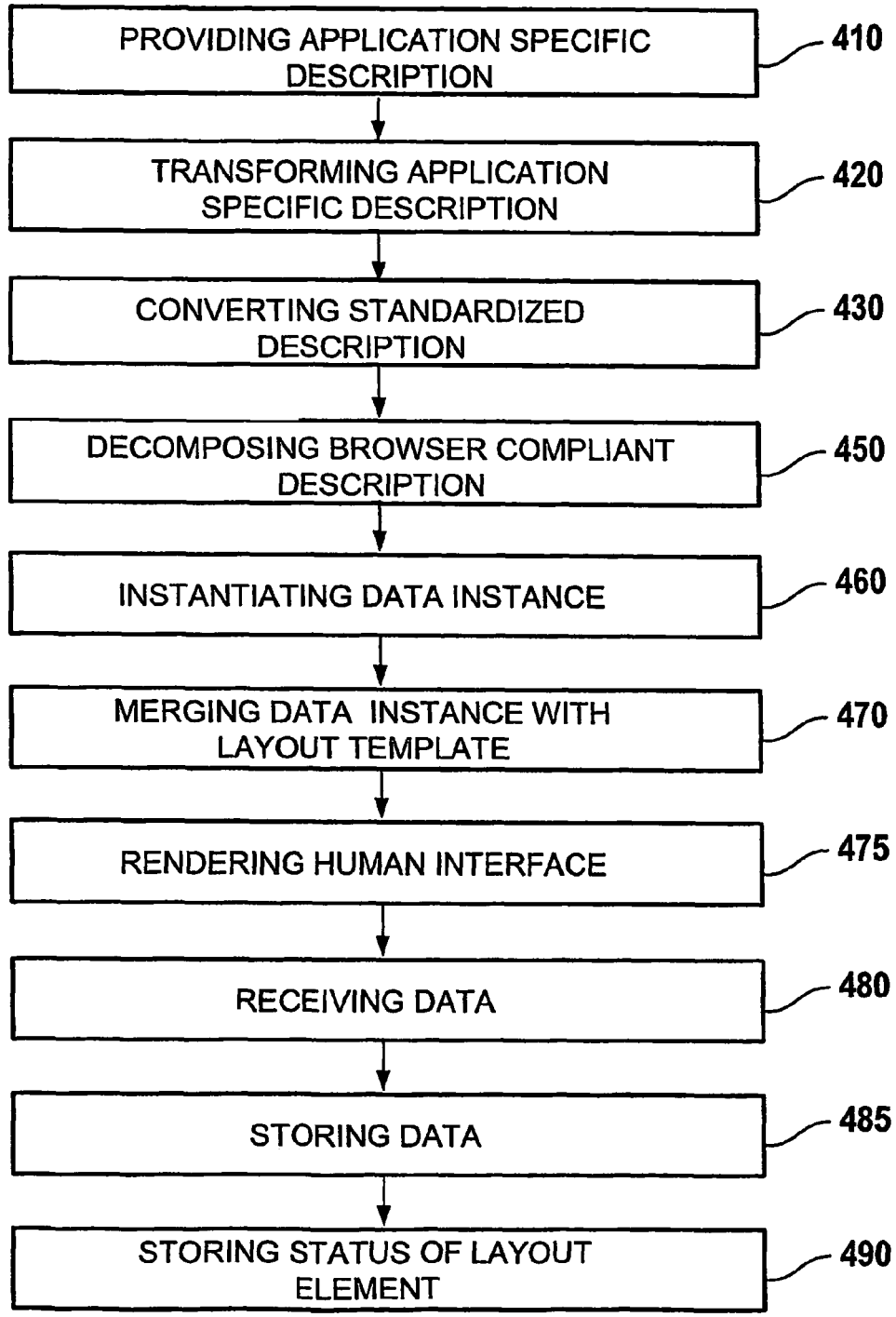
FIGS. 2A-2B illustrate flow charts of two exemplary embodiments of the inventive method for automatically creating and processing a browser compliant human interface description.
Figure 2B:
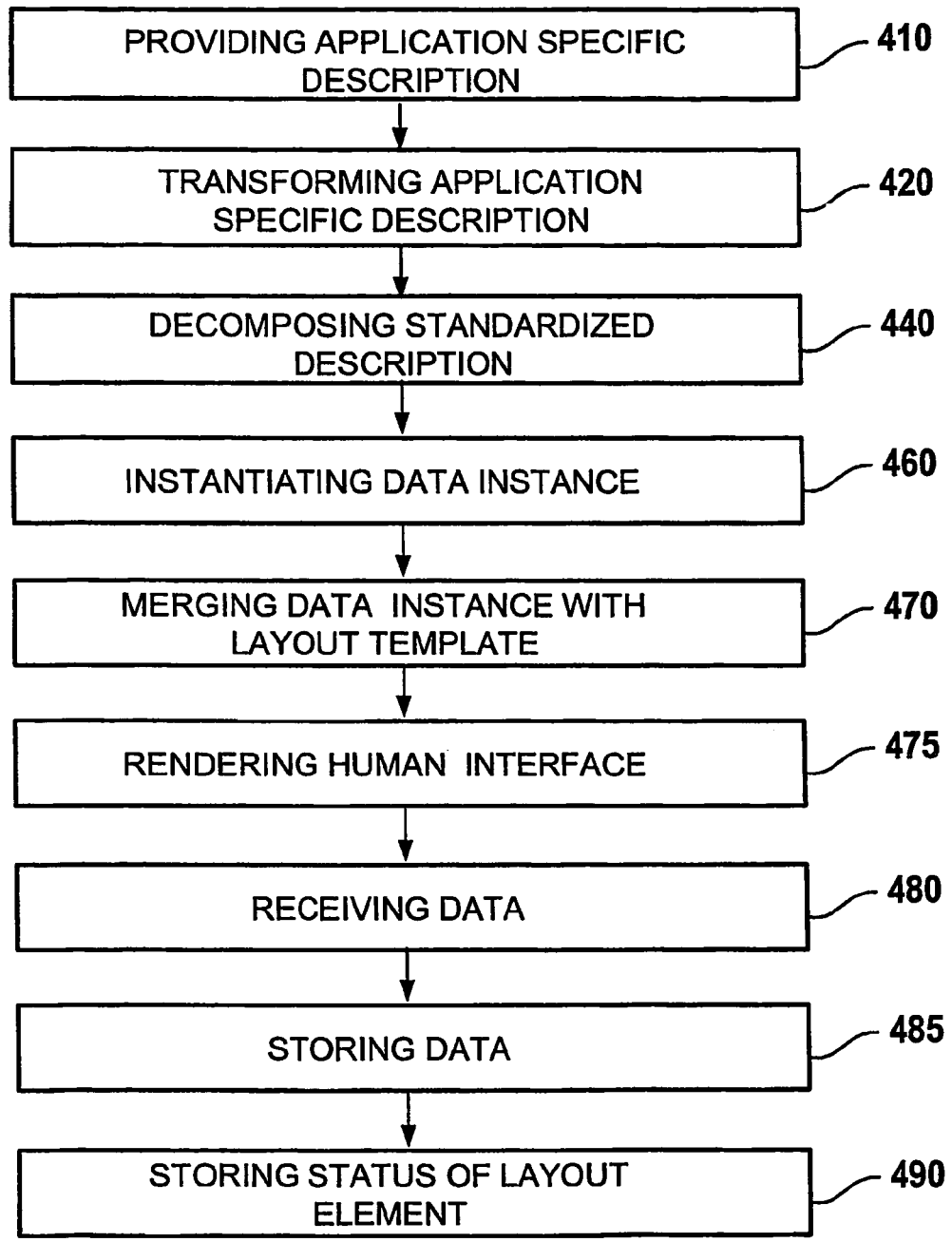

FIGS. 2A and 2B illustrate flowcharts of two exemplary embodiments of the inventive computer-implemented method for automatically creating and processing a browser compliant human interface description.

The human interface example that is used throughout the detailed description is an information-gathering application, such as a survey application. The controller of a company wants to capture financial planning data for the fiscal year 2002 from other managers in the company. For this, reason, the controller creates a survey questionnaire, comprising various question groups. Each question group refers to a specific field, such as "planned costs", or "planned revenues". Each question group can comprise various questions. The question used in this example belongs to the question group "planned costs" and captures "Planned travel costs 2002:". Managers prompted with the questionnaire input their planning data next to the text of the question and submit the data after having filled in the relevant planning data.

All tables with program coding sections that are used in the description are exemplary and explanatory only and not intended to provide a fully functional computer program.

FIG. 2A illustrates, by way of a non-limiting example, a first preferred embodiment of method 400. Method 400 may comprise the steps of:

a) providing 410 predefined application specific human interface description 1101 and b) transforming 420 application specific human interface description 110 (cf. FIG. 4) into standardized human interface description 120.

Figure 4:
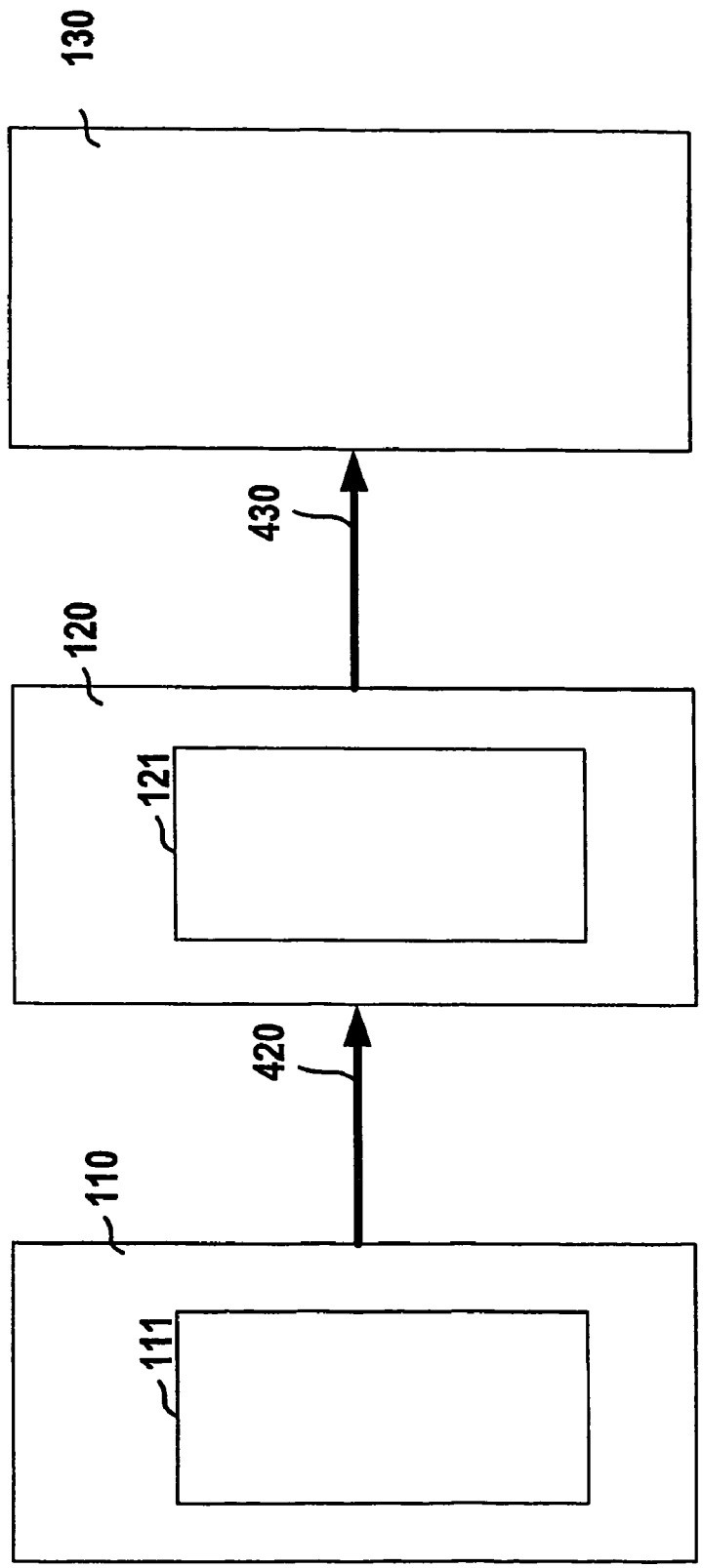
FIG. 4 illustrates documents that are processed in an exemplary implementation of the inventive method.
Figure 5A:
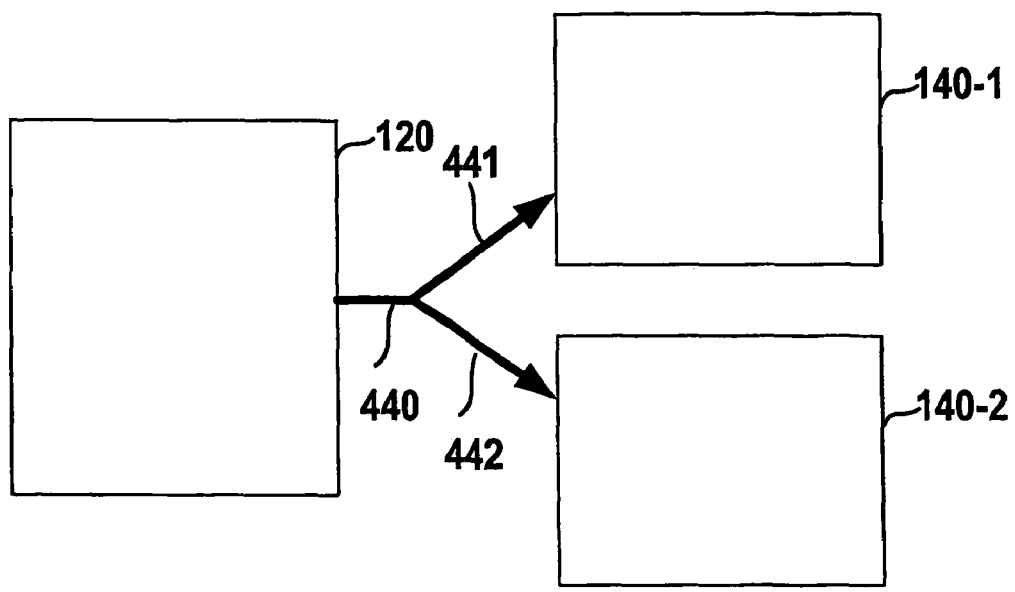
FIGS. 5A-5B illustrate further documents that are processed in an exemplary implementation of the inventive method.
Figure 5B:
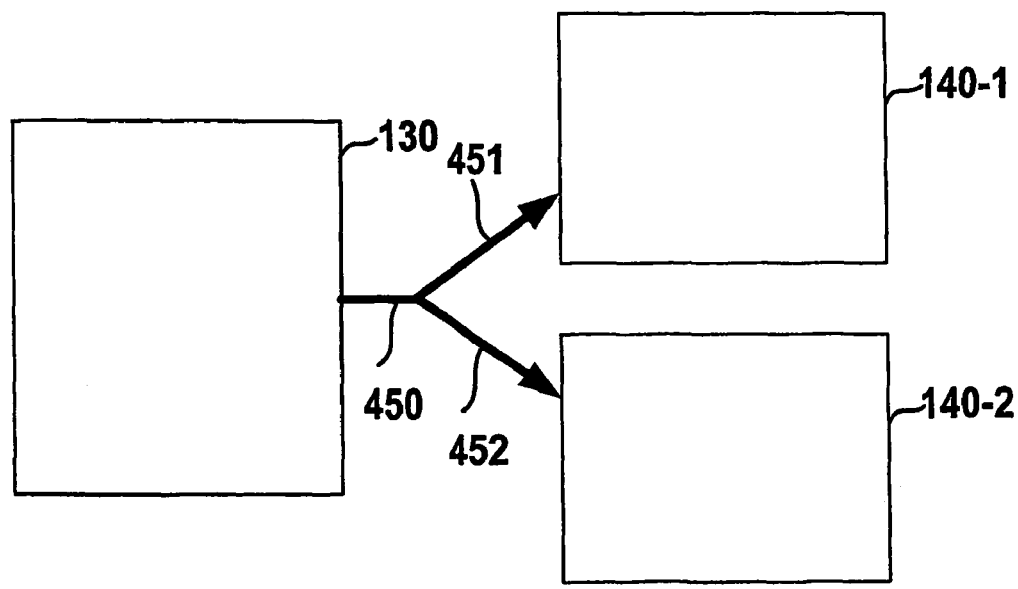
Figure 6:
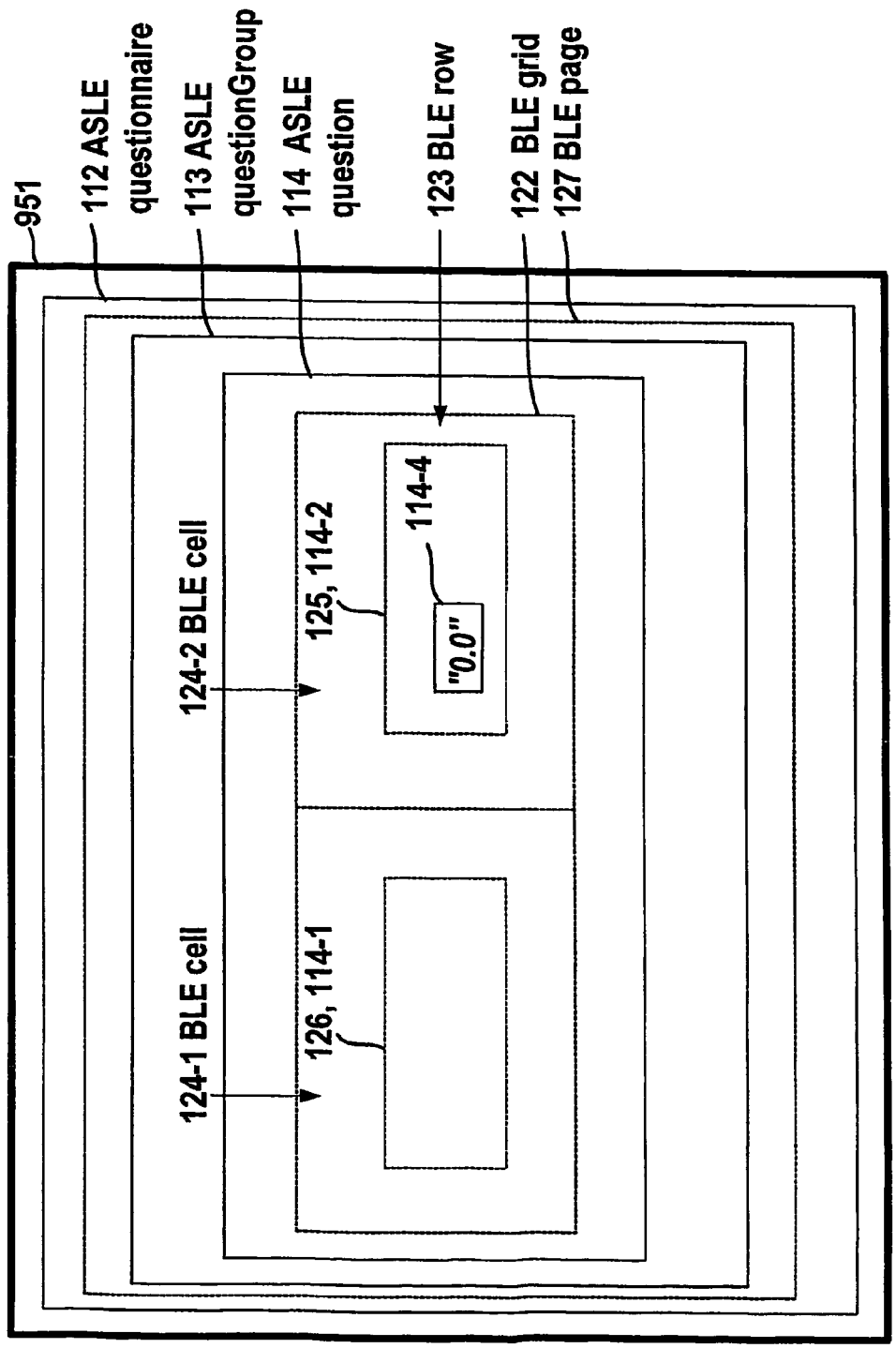
FIG. 6 illustrates ALSEs and BLEs.
Figure 7:
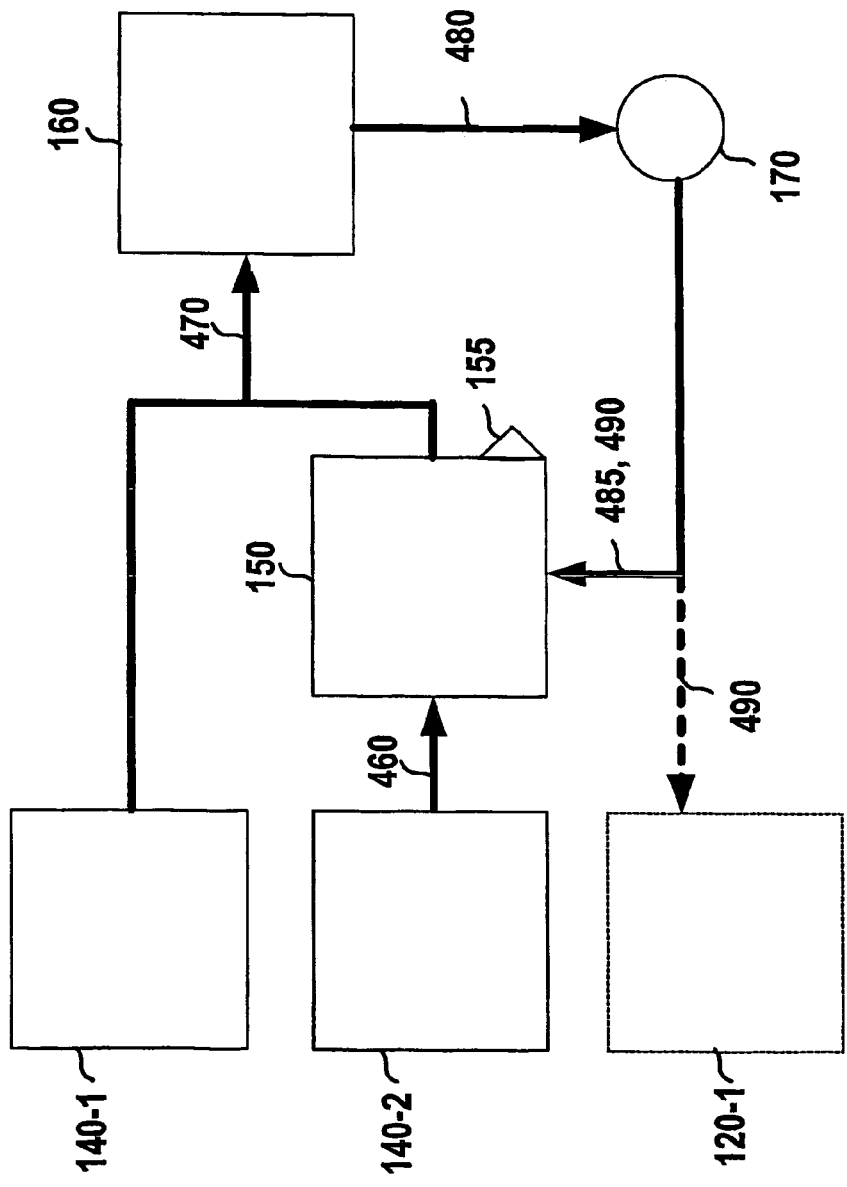
FIG. 7 illustrates processing of documents and data according to an exemplary implementation of the present invention during runtime.

The first embodiment of method 400 optionally comprises the further steps c) to j):

c) converting 430 standardized human interface description 120 into a browser compliant human interface description 130 (cf. FIG. 4).

d) decomposing 450 browser compliant human interface description 130 into human interface layout template 140-1 and data description 140-2 (cf. FIG. 5B).

e) instantiating 460 data instance 150 (cf. FIG. 7) from data description 140-2.

f) merging 470 data instance 150 with human interface layout template 140-1 into individual browser compliant human interface description 160 (cf. FIG. 7).

g) rendering 475 individual browser compliant human interface description 160 to prompt an user (not shown) for data input.

h) receiving 480 data 170 (cf. FIG. 7) from the user.

i) storing 485 the data 170 in data instance 150; and j) storing 490 a status of at least one basic layout element 122, 123, 124-1, 124-2, 125, 126, 127 (cf. FIG. 6).

The steps are now explained in detail.

In the providing step 410, computer system 999 (cf. FIG. 1) provides predefined application specific human interface description 110. Preferably, predefined application specific human interface description 110 is a markup language description document.

Any markup language, such as XML, serves the purpose of defining plurality 111 (cf. FIG. 4) of application specific layout elements (ASLE). Table 1 shows typical examples of ASLEs in the context of three specific applications (survey, financial reporting, service request).

TABLE 1 examples for applications and their application specific layout elements (ASLEs)

| Application | ASLEs |
|---|---|
| Survey | questionnaire, questionGroup, question, etc. |
| Financial reporting | incomeStatement, balanceSheet, accountGroup, account, etc. |
| Service request | serviceRequestor, service, etc. |

Table 2 gives an example of XML-code of the survey application specific human interface description using the ASLEs questionnaire, questionGroup and question. In the example, the prefix "que:" (cf. table 2) in a tag (< >) represents a namespace for the application "survey". The following line numbers refer to table 2. The example shows a questionnaire 112 (cf. FIG. 6) with a name attribute "survey" (line 2). The questionnaire 112 comprises a questionGroup 113 with the name attribute "planned_costs" (line 3). The questionGroup 113 comprises a question 114 with the name attribute "travel" (line 4). Each name attribute represents a relative data path. In this example, the name attributes of the various ASLEs are used to construct a full data path "//survey/planned_costs/travel" from the relative data paths in the name attributes. The full data path becomes part of the data description of the survey application. The full data path specifies the storage location of data for question 114. Using relative data paths allows the application programmer to reuse ASLE definitions without adjusting the name attributes. For example, ASLE question 114 can be copied into any ASLE questionGroup and the full data path is correctly constructed by concatenating the relative data paths in the name attributes of the corresponding ASLEs.

Optionally, an absolute data path can be used. In this case, the name attribute of question 114 is the full data path "//survey/planned_costs/travel," whereas the name attributes of questionnaire 112 and questionGroup 113 are not used for the full data path. Preferably, the data path uses XML Path Language (XPath) notation, known in the art.

XPath is a language that describes a way to locate and process items in XML documents by using an addressing syntax based on a path through the document's logical structure or hierarchy. The XPath language is described in the "XPath W3C Recommendation Version 1.0, Nov. 16, 1999." XPath also allows the application programmer to deal with the document at a higher level of abstraction. XPath is a language that is used by and specified as part of both, XSLT and XPointer (SML Pointer Language). It uses the information abstraction defined in the XML Information Set (Infoset). Since XPath does not use XML syntax itself, it could be used in contexts other than those of XML.

TABLE 2 application specific human interface description document 110 in the survey example

| Line | Code |
|---|---|
| 1 | <?xml version = "1.0" encoding= "utf-8"?> |
| 2 | <que:questionnaire name= "survey" xmlns:que= "http: //www.sap.dom/sapsurvey/questionnaire" > |
| 3 |   <que:questionGroup name= "planned_costs"> |
| 4 |     <que:question name = "travel" text= "Planned travel costs 2002 :" style= "inputField" visible= "{boolean(//survey/ planned_costs/travel)}" default= "0.0"/> |
| 5 |     </que:question> |
| 6 |   </que:questionGroup> |
| 7 | </que:questionnaire> |

The question 114 has the further attributes text 114-1, style 114-2, visible 114-3 and default 114-4. Text attribute 114-1 "Planned travel costs 2002:" indicates the subject of the question to the user. Style attribute 114-2 "inputField" describes a question type, where the answer is written into an input field. An example of another style is "radioButton", where the user can make a selection from multiple choices by selecting a radio button. Dynamic visible attribute 114-3 "{boolean(//survey/planned_costs/travel)}" controls the display of the question. In case a data path "//survey/planned_costs/travel" exists in the data description of the survey application, the question is displayed (visible). Default attribute 114-4 assigns the default value "0.0" to the data path of the question. In lines 5-7, closing tags </ . . . > define the end of the corresponding ASLE definitions.

In the transforming step 420, application specific human interface description 110 may be transformed into standardized human interface description 120. Preferably, standardized human interface description 120 may be a markup language description. Any markup language, such as XML, serves the purpose of defining plurality 121 of basic layout elements 122, 123, 124-1, 124-2, 125, 126, 127. Preferably, a style sheet language transformation, such as XSLT, may execute the transforming step 420 by using transformation rules. Examples of transformation rules in the survey example are shown in table 3.

The following line numbers refer to table 3. Line 1 indicates the start of a XML document. Line 2 indicates the start of a XSLT transformation. The "xsl:" prefix indicates a XSLT instruction. The "uicl:" prefix indicates the definition of BLEs in SIDL.

Line 4 indicates the start of the transformation rule for the ASLE questionnaire 112. The BLE that is matched with questionnaire 112 is page 127 (line 5). The BLE page 127 may comprise other layout elements (line 6). Lines 7 and 8 close the definition of the questionnaire transformation rule.

Line 9 indicates the start of the transformation rule for the ASLE questionGroup 113. The BLE that is matched with questionGroup 113 is Grid 122 (line 10). Grid 122 has a number of rows that corresponds to the number of questions in questionGroup 113 and two columns (line 10). Line 11 includes further BLEs (e.g. rows) in Grid 122. Lines 12 and 13 close the questionGroup transformation rule.

Line 14 indicates the start of the transformation rule for the ASLE question 114 in questionGroup 113. The question 114 is transformed into BLE Row 123 (line 15) with two cells 124-1, 124-2 (BLEs). The row 123 carries a row attribute "visible" derived from the question attribute visible 114-3.

BLE Cell 124-1 (line 16) includes BLE TextOutput 126 (line 17). TextOutput 126 is matched with the question attribute text 114-1 (line 17). Cell 124-2 (line 19) includes the BLE FieldInput 125 (line 22). FieldInput 125 is matched with the question style attribute 114-2 InputField (line 21). Further, the question default attribute 114-4 value is assigned to BLE FieldInput 125 (line 22). Input data 170 (cf. FIG. 7) received from the user in FieldInput 125 are stored under the corresponding full data path that is constructed by using the relative data paths in, the name attributes (lines 23, 24). Lines 18 and 25 to 31 close the transformation rules for the question ASLE.

TABLE 3

ASLE-to-BLE transformation rules in the survey example

| Line | Code |
|---|---|
| 1 | <?xml version="1.0" encoding="utf-8"?> |
| 2 | <xsl:transform version="1.0" xmlns:xsl= "http://www.w3.org/1999/XSL/Transform" xmlns:que="http://www.sap.com/sapsurvey/ questionnaire" xmlns:uicl="http://www.sap.com/sapsurvey/ ble" > |
| 3 | ... |
| 4 | <xsl :template match="que:questionnaire"> |
| 5 |   <uicl:Page> |
| 6 |     <xsl:apply-templates select ="*"/> |
| 7 |   </uicl:Page> |
| 8 | </xsl:template> |
| 9 | <xsl:template match="que:questionGroup"> |
| 10 |   <uicl:Grid name="{@name}" rows="{count(. /que:question) }"cols="2"> |
| 11 |     <xsl:apply-templates select ="*" mode ="QuestionGroup"/ > |
| 12 |   </uicl:Grid> |
| 13 | </xsl:template> |
| 14 | <xsl:template match="que:question" mode="QuestionGroup" > |
| 15 |   <uicl:Row visible="{@visible}"> |
| 16 |     <uicl:Cell> |
| 17 |       <uicl:TextOutput text="{@text}"/> |
| 18 |     </uicl:Cell> |
| 19 |     <uicl:Cell> |
| 20 |       <xsl:choose> |
| 21 |         <xsl:when test="@style='inputField'"> |
| 22 |           <uicl:FieldInput default="{@default}"> |
| 23 |             <xsl:attribute name="name"> |
| 24 |               <xsl:call-template name="write_name_path"/> |
| 25 |             </xsl:attribute> |
| 26 |           </uicl:FieldInput> |
| 27 |         </xsl:when> |
| 28 |       </xsl:choose> |
| 29 |     </uicl:Cell> |
| 30 |   </uicl:Row> |
| 31 | </xsl:template> |
| 32 | </xsl:transform> |

In the survey example, processor 910 of computer system 999 (cf. FIG. 1) processes table 2 with respect to the transformation rules of table 3. The output of this transformation is shown in table 4. Table 4 corresponds to a XML document that describes the same human interface 951 (cf. FIG. 6) as table 2 comprising BLEs of plurality 121 instead of ASLEs of plurality 111. The BLEs in table 4 are derived from the ASLEs in table 2 via the corresponding transformation rules in table 3. The advantage of this transformation is a standardized, application independent and browser independent format to describe the human interface 951.

The following line numbers refer to table 4. BLE page 127 is defined in line 2 and closed in line 14. Page 127 comprises further. BLEs. Line 4 describes the BLE Grid 122 that is derived from ASLE questionGroup 113. Grid 122 in this example has one row and two columns. Grid 122 comprises BLE Row 123 that is derived from the ASLE question 114. Row 123 carries the visible attribute 114-1 (Line 5). Row 123 comprises BLEs 125, 126 (lines 9, 6). BLE 126 is derived from question text attribute 114-1 (Line 7). BLE 125 is derived from question style attribute 114-2 (Line 10) and default attribute 114-4 stays a default attribute of BLE 125. The full data path for the data of BLE 125 is determined by the question transformation rule of table 3. Lines 8 and 11-14 are closing commands of the corresponding BLE.

TABLE 4 standardized human interface description document 120 in the survey example

| Line | Code |
|---|---|
| 1 | <?xml version="1.0" encoding="utf-8"?> |
| 2 | <uicl:page id="survey" xmlns:uicl="http://www.sap.com/sapsurvey/ble"> |
| 3 | ... |
| 4 | <uicl:Grid rows="1" cols="2" id="planned costs"> |
| 5 |   <uicl:Row visible="{boolean(//survey/planned_costs/travel)}"> |
| 6 |     <uicl:Cell> |
| 7 |       <uicl:TextOutput text=" Planned travel costs 2002 :" /> |
| 8 |     </uicl:Cell> |
| 9 |     <uicl:Cell> |
| 10 |       <uicl:FieldInput default="0.0" name="//survey/planned_costs/travel" /> |
| 11 |     </uicl:Cell> |
| 12 |   </uicl:Row> |
| 13 | </uicl:Grid> |
| 14 | </uicl:page> |

In the optional converting step 430, standardized human interface description 120 may be converted into browser compliant human interface description 130 (cf. FIG. 4). Preferably, browser compliant human interface description 130 may be a markup language description document. For example, a document for a conventional browser on a personal computer can be written in HTML or XHTML. Preferably, the conversion from standardized human interface description document 120 into browser compliant human interface description document 130 is performed via a style sheet language transformation, such as XSLT by using appropriate conversion rules. For example, the conversion of XML documents into XHTML documents via XSLT is known in the art. Preferably, conversion rules are implemented in a similar way as the transformation rules described in table 3. Preferably, processor 920 may apply the conversion rules to standardized human interface description document 120 and the BLEs may be converted into corresponding browser compliant markup language instructions of browser compliant human interface description document 130. An advantage of the conversion is that the browser compliant human interface description document 130 may be editable by a user for further refinement of the layout with standard web-authoring tools, such as Microsoft FrontPage or Adobe GoLive.

Table 5 illustrates a XHTML document example of browser compliant human interface description 130 in the survey example. The standard HTML instructions are not explained in detail as they are known to any person of skill in the art. The following line numbers refer to table 5. BLE page 127 (cf. FIG. 6) is converted into lines 1-6 and 22-24, where line 6 defines an interaction method for the page 127. BLE grid 122 is converted into the table instructions of lines 9, 20 having one row 123 (lines 10, 19). Cell 124-1 conversion results in lines 11-13 and cell 124-2 conversion in lines 14-18. The text between the "span" tags in line 12 results from BLE 126 (cf. table 4, line 7). The name attribute of the input field instruction (line 16) corresponds to the full data path.

TABLE 5 browser compliant human interface description document 130 in the survey example

| Line | Code |
|---|---|
| 1 | <html xmlns="http://www.w3.org/TR/xhtml1"> |
| 2 |   <head> |
| 3 |     ... |
| 4 |   </head> |
| 5 |   <body> |
| 6 |     <form method="post" name="survey"> |
| 7 |       ... |
| 8 |       ... |
| 9 |       <table> |
| 10 |         <tr> |
| 11 |           <td> |
| 12 |             <span>Planned travel costs 2002 :</span> |
| 13 |           </td> |
| 14 |           <td> |
| 15 |             <span> |
| 16 |               <input name="//survey/planned_costs/travel" type="text" value="0.0"/> |
| 17 |             </span> |
| 18 |           </td> |
| 19 |         </tr> |
| 20 |       </table> |
| 21 |       ... |
| 22 |     </form> |
| 23 |   </body> |
| 24 | </html> |

The input field instruction carries the further attributes type and value. The type attribute "text" results from FieldInput BLE 125 (cf. table 4, line 10) and the value attribute from the corresponding default value "0.0."

In the optional decomposing step 450, computer system 999 extracts human interface layout template 140-1 and data description 140-2 (cf. FIG. 5B) from browser compliant human interface description 130. As discussed earlier, for some applications, such as a survey or a service request, a data description does not exist at the point in time, when the human interface 951 (cf. FIG. 6) for the application is described. Therefore, for some applications, browser compliant human interface description document 130 comprises a mix of layout information and data description. Preferably, during runtime the data are separately stored from the layout information. This allows a user specific and application specific instantiation and initialization of data without storing redundant layout information with each data instance. Preferably, decomposing step 450 is performed by applying style sheet language transformation, such as XSLT, to browser compliant human interface description 130. The details of extracting 451 layout template 140-1 and extracting 452 data description 140-2 are explained under FIG. 3B.

The further optional steps e) instantiating 460, f) merging 470, g) rendering 475, h) receiving 480 i) storing 485 the data and j) storing 490 a status are explained in detail under FIG. 7.

FIG. 2B illustrates a second, preferred embodiment of method 400. The difference to the first embodiment (cf. FIG. 2A) is the replacement of steps c) and d) (converting standardized description 430 and (decomposing browser compliant description 450) by step k) decomposing standardized description 440. In the first embodiment the application programmer can refine the human interface layout description after step 430 and the decomposing step 450 is executed based on the refined layout description (browser compliant human interface description 130). On the other hand, in the second embodiment, decomposing step 440 is automatically executed based on the standardized human interface description 120. The automatic human interface creation in this case does not allow the programmer to refine the layout. In the decomposing step 440, computer system 999 extracts human interface layout template 140-1 and data description 140-2 (cf. FIG. 5A) from standardized human interface description 120. Preferably, decomposing step 440 is performed by applying style sheet language transformation, such as XSLT, to standardized human interface description 120. The details of extracting 441 layout template 140-1 and extracting 442 data description 140-2 are explained under FIG. 3A.

Figure 3A:
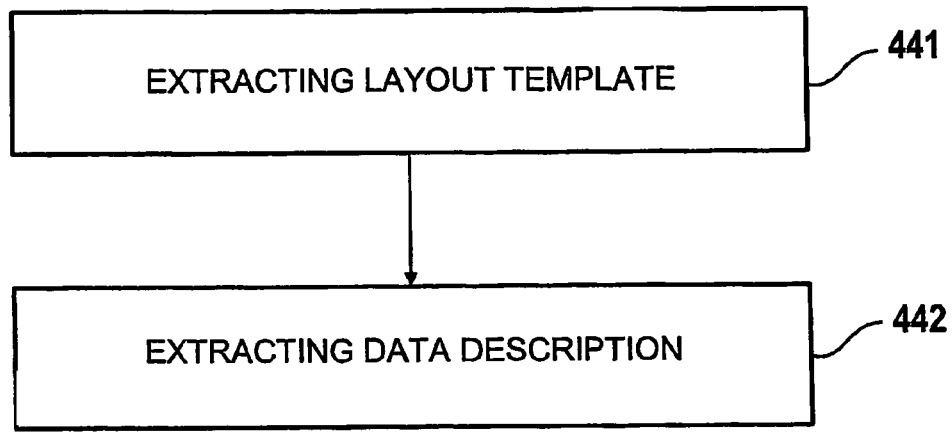
FIGS. 3A-3B illustrate details of some method steps of an exemplary implementation of the present invention.
Figure 3B:
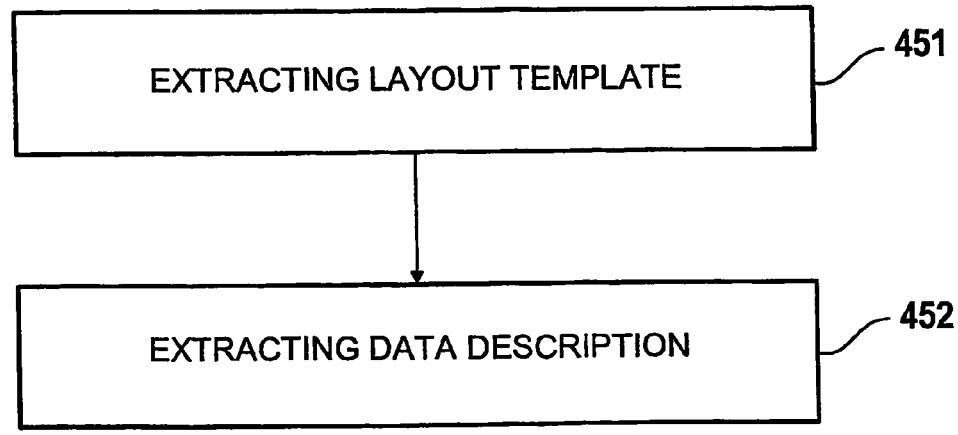

FIGS. 3A and 3B illustrate details of some method 400 steps of an exemplary implementation of the present invention.

FIG. 3A illustrates sub-steps extracting 441 layout template 140-1 (cf. FIG. 5A) and extracting 442 data description 140-2 of decomposing step 440.

In the extracting layout template step 441, computer system 999 processes standardized human interface description 120 (cf. FIG. 5A), preferably using a style sheet transformation; such as XSLT (cf. table 6), to create layout template 140-1.

For convenience of explanation, table 6 comprises an example of a transformation rule for the BLE FieldInput 125 (cf. table 4, line 10; cf. FIG. 6), because BLE FieldInput 125 comprises both layout information and data. Transformation rules for other layout elements can be defined accordingly by any person skilled in the art. The following line numbers without explicit table reference refer to table 6.

TABLE 6 transformation rules for extracting layout template 140-1 from standardized human interface description 120 in the survey example

| Line | Code |
|---|---|
| 1 | <xsl:transform version="1.0" xmlns:xsl="http://www.w3.org/1999/XSL/Transform" xmlns:uicl="http://www.sap.com/sapsurvey/ble"> |
| 2 | ... |
| 3 | <xsl:template match="uicl :FieldInput"> |
| 4 | <input class="InputField" name="{@name}" type="text"> |
| 5 | <xsl:element name="xsl :attribute"> |
| 6 | <xsl:attribute name="name">value</xsl:attribute> |
| 7 | <xsl:element name="xsl :value-of"> |
| 8 | <xsl:attribute name="select"> <xsl:value-of select="@name"/> </xsl:attribute> |
| 9 | </xsl:element> |
| 10 | </xsl:element> |
| 11 | </input> |
| 12 | </xsl:template> |
| 13 | ... |
| 14 | </xsl:transform> |

Lines 1, 14 indicate a XSL transformation document. Lines 3, 12 enclose the transformation rule for BLE FieldInput 125.

Line 4 generates line 11 of target-table 7 when applied to line 10 of source-table 4. Target-table 7 is a preferred XSLT implementation of layout template 140-1 in the survey example. The data information in the form of the default attribute value "0.0" (cf. source-table 4, line 10) is not generated into layout template 140-1. Layout information is now separated from data. However, a placeholder allows to link to the corresponding data.

TABLE 7 layout template document 14.0-1 in the survey example

| Line | Code |
|---|---|
| 1 | <?xml version="1.0" encoding="utf-8"?> |
| 2 | <xsl:transform version="1.0" xmlns :xsl= "http://www.w3.org/1999/XSL/Transform"> |
| 3 | <xsl:template match="/"> |
| 4 | ... |
| 5 | <html> |
| 6 | <form method="post" name="survey"> |
| 7 | <table class="Grid"> |
| 8 | <xsl:if test="{boolean(//survey/planned_costs/travel) }"> |
| 9 | <tr class="row"> |
| 10 | <td> <span class="TextOutput">Planned travel costs 2002 :</span> </td> |
| 11 | <td> <input class="InputField" name="//survey/planned_cost/travel" type="text"> |
| 12 | <xsl:attribute name="value"> |
| 13 | <xsl:value-of select= "/env:envelope/env:body/ survey/planned_costs/travel"/> |
| 14 | </xsl:attribute> |
| 15 | </input> </td> |
| 16 | </tr> |
| 17 | </xsl:if> |
| 18 | </table> |
| 19 | </form> |
| 20 | </html> |
| 21 | ... |
| 22 | </xsl:template> |
| 23 | </xsl:transform> |

Lines 5-10 generate the XSL attribute instructions in lines 12, 14 of target-table 7 for the value attribute with the "value-of" instruction (table 7, line 13). The "value-of" instruction points to the location where the value is stored (e.g. data instance 150; cf. FIG. 7) and, therefore, provides the link between the separated layout and data information.

In the extracting data description step 442, computer system 999 processes standardized human interface description 120 (cf. FIG. 5A), preferably using a style sheet transformation, such as XSLT, to create data description 140-2. In the survey example, the XSL transformation processes the XML document in table 4 by scanning the document for name attributes. Each time a name attribute having data path information is detected, corresponding tags (<data_path_element>, </data_path_element>) are inserted for each data path element into data description document 140-2 (cf. table 8). Preferably, data description document 140-2 is written in a markup language, such as XML. The name attribute "//survey/planned_costs/travel" is detected in line 10 of table 4. The resulting data description 140-2 document in the survey example is shown in table 8. The following line numbers refer to table 8. Line 1 indicates a XML document. Lines 2-4 define the data path "//survey/planned_costs/travel" of default value "0.0" (line 4). The closing tags </ ... > (lines 4 to 6) complete the definition of the data path.

TABLE 8 data description document 140-2 in the survey example

| Line | Code |
|---|---|
| 1 | <?xml version="1.0" encoding="utf-8"?> |
| 2 | <survey> |
| 3 |    <planned_costs> |
| 4 |      <travel>0.0</travel> |
| 5 |    </planned_costs> |
| 6 | </ survey> |

FIG. 3B illustrates sub-steps extracting 451 layout template 140-1 (cf. FIG. 5A) and extracting 452 data description 140-2 of decomposing step 450.

In the extracting layout template step 451, computer system 999 processes browser compliant human interface description 13.0 (cf. FIG. 5B), preferably using a style sheet transformation, such as XSLT, to create layout template 140-1. Table 9 illustrates, for the survey example, transformation rules that transform browser compliant human interface description 130 (cf. source-table 5) into layout template 104-1 (of target-table 7). For convenience of explanation, table 9 comprises a example of a transformation rule for the input field instruction (cf. table 5, line 16), because the input field instruction comprises both, layout information and data. Transformation rules for other layout elements can be defined accordingly by any person skilled in the art. The following line numbers without explicit table reference refer to table 9.

Line 1 indicates the start of a XSLT document. Lines 3, 13 indicate that the comprised coding applies to the input field instruction of source-table 5 (cf. table 5, line 16). Lines 4, 12 copy the input, field instruction of source-table 5 resulting in lines 11, 15 of target-table 7. Line 5 copies all source-table attributes except value attributes. Therefore, line 11 of target-table 7 has no value attribute. Layout information is now separated from data. However; a placeholder allows to link to the corresponding data. Therefore, lines 6-11 generate XSL instructions for the value attribute into lines 12-14 of target-table 7. Lines 6, 7, 11 generate an attribute instruction for the value attribute (of the input field instruction) in lines 12, 14 of target-table 7. Lines 8-10 generate line 13 of target-table 7 that comprises a "value-of" instruction to retrieve the eliminated data from the corresponding location in data instance 150.

TABLE 9 transformation rules for extracting layout template 140-1
from browser compliant human interface description
130 in the survey example

| Line | Code |
|---|---|
| 1 | <?xml version="1.0"encoding="utf-8"?><br><xsl:transform version="1.0"<br>xmlns:xsl="http://www.w3.org/1999/XSL/Transform"> |
| 2 | ... |
| 3 | <xsl:template match="input"> |
| 4 | <xsl:copy> |
| 5 | <xsl:copy-of select="@*[name( ) !='value']"/> |
| 6 | <xsl:element name="xsl:attribute"> |
| 7 | <xsl:attribute name="name">value</xsl:attribute> |
| 8 | <xsl:element name="xsl:value-of"> |
| 9 | <xsl:attribute name="select">/<xsl:value-of select="@name"/> </xsl:attribute> |
| 10 | </xsl:element> |
| 11 | <xsl:element> |

TABLE 9-continued transformation rules for extracting layout template 140-1
from browser compliant human interface description
130 in the survey example

| Line | Code |
|---|---|
| 12 | </xsl:copy> |
| 13 | </xsl:template> |
| 14 | ... |
| 15 | </xsl:transform> |

In the extracting data description step 452, computer system 999 processes standardized human interface description 130 (cf. FIG. 5B), preferably using a style sheet transformation, such as XSLT, to create data description 140-2.

In the survey example, the XSL transformation may, process the XHTML document in table 5 by scanning the document for name attributes. Each time a name attribute having data path information is detected, corresponding tags for each data path element (<data_path_element>, </data_path_element>) of the data path information may be inserted into data description document 140-2 (cf. table 8). The name attribute "/survey/planned_costs/travel" is detected in line 16 of table 5. The resulting data description 140-2 document in the survey example is shown in table 8 and already explained under FIG. 3A.

Layout template 140-1 and data description 140-2 are equivalent to the corresponding documents described under FIG. 3A. In the survey example, the documents described in tables 7 and 8 are created.

FIG. 4 illustrates documents 110, 120 and 130 that are processed 420, 430 in the inventive method 400.

Predefined application specific human interface description 110 may comprise plurality 111 of application specific layout elements 112, 113, 114 (cf. FIG. 6). Preferably, the ASLEs may be described in a markup language, such as XML (cf. Table 2).

Computer system 999 may apply transformation rules for ASLE-to-BLE transformation (cf. table 3) to application specific human interface description 110 to transform 420 it into standardized human interface description 120. Standardized human interface description 120 may comprise plurality 120 of basic layout elements 122, 123, 124-1, 124-2, 125, 126 and 127. Preferably, the BLEs may be described in a markup language, such as XML (cf. Table 4) and the transformation may be a style sheet language transformation, such as XSLT.

Optionally, computer system 999 applies conversion rules to standardized human interface description 120 to convert 430 it into browser compliant human interface description 130. Browser compliant human interface description 130 is editable with conventional web authoring tools, such as Microsoft FrontPage or Adobe GoLive. For example, browser compliant human interface description 130 is a markup language document (e.g. XHTML), where all BLE elements are converted into markup language instructions (e.g. XHTML instructions) that can be rendered by a conventional browser (cf. table 5). Preferably, the conversion is a style sheet language transformation, such as XSLT that converts XML statements into XHTML instructions, which is known in the art.

FIGS. 5A and 5B illustrate further documents 140-1, 140-2 that are processed in an exemplary implementation of method 400.

FIG. 5A illustrates decomposing 440 standardized human interface 120 into layout template 140-1 and data description 140-2. Transformation rules for extracting 441 layout template 140-1 are described in detail in table 6. Extracting 442 data description 140-2 is described in detail under FIG. 3A.

FIG. 5B illustrates decomposing 450 browser compliant human interface description 130 into layout template 140-1 and data description 140-2. Extracting 451 layout template 140-1 is described in detail in table 9. Extracting 442 data description 140-2 is described in detail under FIG. 3B.

FIG. 6 illustrates ALSEs 112, 113, 114 and BLEs 122, 123, 124-1, 124-2, 125, 126 and 127 in an exemplary implementation of the present invention. ALEs are shown with solid lines and BLEs with dashed lines.

The human interface description is first described with ALSEs. In the survey example the ASLEs questionnaire 112, questionGroup 113 and question 114 are used. The ASLEs reflect the logical structure of human interface 951 where questionnaire 112 comprises at least one questionGroup 113 and questionGroup 113 comprises at least one question 114. Question 114 has attributes, such as attributes 114-1 to 114-4. For example, human interface 951 is displayed on output device 950 (cf. FIG. 1).

BLEs in a SIDL typically have an application independent or graphical character, such as page 127, grid 122, row 123 or cell 124-1, 124-2. Different types of data, such as TextOutput field 126 or inputField 125, can be assigned to a cell. A cell can even comprise a further grid that comprises further rows and cells, wherein radio buttons, checkboxes or any other data type gets assigned to the cell. Therefore, the generic nature of BLEs allows to compose any kind of application specific human interface 951.

The present invention may provide method 400 (cf. FIGS. 2A-2B) to automatically transform the logically structured ASLEs 112, 113, 114 into the graphically structured BLEs 122, 123, 124-1, 124-2, 125, 126, 127. The assignments of BLEs to ASLEs may be described as transformation rules (cf. description of FIGS. 2A-2B, table 3). In the survey example, the following assignments of table 10 are defined in the transformation rules of table 3:

TABLE 10

ASLE-to-BLE assignments in the survey example

| ASLE | BLE |
| --- | --- |
| questionnaire 112 | page 127 |
| questionGroup 113(with n questions) | grid 122 (with n rows and 2 cells) |
| question 114 with attribute "visible" 114-3 | row 123 of grid 122 (with 2 cells 124-1, 124-2) with row attribute "visible" |
| question attribute "text" 114-1 | "TextOutput" 126 |
| question attribute "style" 114-2 (value=InputField) | "FieldInput" 125 |
| question attribute "default" 114-4 | attribute "default" of BLE 125 |

FIG. 7 illustrates processing of documents 140-1, 140-2, 150, 160 (optional 120-1) and data 170 according to an exemplary implementation of the present invention during runtime. Document 120-1 is a runtime copy of standardized user interface description 120.

In a preferred embodiment of the present invention, computer system 999 (cf. FIG. 1) may execute the remaining, optional steps of method 400 (cf. FIGS. 2A-2B) during runtime:

e) instantiating 460 data instance 150 from data description 140-2;

f) merging 470 data instance 150 with human interface layout template 140-1 into individual browser compliant human interface description 160;

g) rendering 475 (cf. FIGS. 2A-2B) individual browser compliant human interface description 160 to prompt an user (not shown) for data input;

h) receiving 480 data 170 from the user;

i) storing 485 the data 170 in data instance 150; and j) storing 490 a status of at least one basic layout element (122, 123, 124-1, 124-2, 125, 126, 127).

In the instantiating step 460, computer system 999 may complement data description 140-2 by further runtime dependent data (data that are created or modified during runtime) resulting in data instance 150. Examples for runtime dependent data include user name, document creation date, session ID, error messages, etc. Preferably, data instance 150 may be a markup language document, such as an XML document. The following line numbers refer to table 11. In the survey example, table 11 illustrates an envelope (lines 2, 13) comprising the runtime dependent data user name ("USER1", line 4) in its header (lines 3, 5), whereas the data description (lines 7-11) forms its body (lines 6, 12). The envelope name space is represented by the prefix "env:".

TABLE 11 data instance document 150 in the survey example

| Line | Code |
| --- | --- |
| 1 | <?xml version="1.0" encoding="utf-8"?> |
| 2 | <env:envelope xmlns:env="http://www.sap.com/sapsurvey env"> |
| 3 |   <env:header> |
| 4 |     <env:user>USER1</env:user> |
| 5 |   </env:header> |
| 6 |   <env:body> |
| 7 |     <survey> |
| 8 |       <planned_costs> |
| 9 |         <travel>0.0</travel> |
| 10 |       </planned_costs> |
| 11 |     </survey> |
| 12 |   </env:body> |
| 13 | </env:envelope> |

In the merging step 470, layout template 140-1 is applied to data instance 150. Preferably, this corresponds to a style sheet transformation (cf. table 7) of data instance 150.

If required, data instance 150 is modified; for example, by an application program (e.g. computer program 101 on computer 901), prior to applying layout template 140-1. This is achieved through interface 155. For example, computer system 999 (cf. FIG. 1) transfers data of data instance 150 (e.g. on computer 900) to the application program through interface 155 and data instance 150 receives modified data from the application program through interface 155. The advantage is an application specific initialization of data instance 150. For example, in the survey example a user (e.g. USER1, cf. table 11, line 4) wants to input the planned travel costs for the next fiscal year. The default value that is derived from the corresponding data description 140-2 is "0.0" (cf. table 11, line 9). In the example, the application program knows the real travel cost of the user for the previous fiscal year. The application program is called through interface 155 and runs a query for the previous travel cost. The result value is returned to data instance 150 through interface 155 and replaces the old default value.

Table 12 shows individual browser compliant human interface description document 160 as result of merging step 470. Preferably, document 160 is written in a markup language, such as XHTML. The following line numbers refer to table 12. Document 160 is similar to the document 130 in table 5. The differences in lines 4 and 10 are explained in detail in the storing status step 490. In line 19 of the survey example, layout information (input) and data from data instance 150 (default value "0.0") are merged when lines 11-15 of table 7 (layout template 140-1) are applied to table 11 (data instance 150).

TABLE 12 individual browser compliant human interface description document 160 in the survey example

| Line | Code |
|---|---|
| 1 | <?xml version="1.0" encoding="utf-8"?> <html xmlns="http://www.w3.org/TR/xhtml1"> |
| 2 | <head> |
| 3 | ... |
| 4 | <!--Functions (e.g. JavaScript) : a) set cursor on page display b) determine cursor position on page submission --> |
| 5 | ... |
| 6 | </head> |
| 7 | <body> |
| 8 | <form method="post" name="survey"> |
| 9 | ... |
| 10 | <input type hidden name="//env:envelope/ env:states/uicl:page/@cursorPos" value="//survey/planned_costs/travel"/> |
| 11 | ... |
| 12 | <table> |
| 13 | <tr> |
| 14 | <td> |
| 15 | <span>Planned travel costs 2002 :</span> |
| 16 | </td> |
| 17 | <td> |
| 18 | <span> |
| 19 | <input name="//survey/planned_costs/ travel" type="text" value="0.0"/> |
| 20 | </span> |
| 21 | </td> |
| 22 | </tr> |
| 23 | </table> |
| 24 | ... |
| 25 | </form> |
| 26 | </body> |
| 27 | </html> |

In rendering step 475 (cf. FIGS. 2A-2B), individual browser compliant human interface description 160 may be rendered by a conventional browser, for example on output device 950 (cf. FIG. 1). In the survey example, the user is prompted with a screen that has a structure similar to the BLEs shown in FIG. 6 (dashed lines). The user reads the question text in TextOutput BLE 126 and is expected to input data in FieldInput BLE 125, where a default value is displayed. If more than one question is displayed, the user can perform more than one data input. After having finished all data inputs, the user submits the data 170. For example, submission of data may be performed by clicking an appropriate button on human interface 951 or by selecting an "ENTER" key on input device 940 (cf. FIG. 1).

In the receiving data step 480, a computer of computer system 999 (e.g. computer 900, cf. FIG. 1) receives the data 170 from the user via user interface 960 (cf. FIG. 1). Data 170 comprise at least one data set. Preferably, data 170 are received in a format that comprises a name and a value for each data set of data 170. Preferably, the name of each data set is a XPath that is compliant with data instance 150 and indicates the storage location of the corresponding value of the data set. Table 13 illustrates data 170 in the survey example. Each row of table 13 corresponds to a data set of data 170.

TABLE 13 format of data 170 in the survey example

| Name | Value |
|---|---|
| //survey/planned_costs/travel | 5000 |
| ... | ... |

In the storing data step 485, the data 170 are stored in data instance 150 at the corresponding location. In the survey example, the storage location is implicitly known from the name column of table 13 (e.g. "//survey/planned_costs/ travel"). Optionally, after having stored the data 170, the data 170 can be processed by an application program (not shown) by using interface 155, similar to the description of the merging step 470.

In the storing status step 490, the status of at least one basic layout element (122, 123, 124-1, 124-2, 125, 126, 127) is stored in data instance 150. Alternatively, the status can be stored in runtime copy 120-1 of standardized human interface description 120 (dashed lines).

The status of a basic layout element comprises information about the layout element at the point in time when the user submits data 170. For example, if the user expanded a hierarchy while interacting through the human interface 951, the expansion status of the hierarchy is stored. In the survey example, the status of BLE page 127 is the position of a cursor on human interface 951 (cf. FIG. 6). In case, the user inputs data into more than one BLE FieldInput, the cursor typically stays in the BLE that received the last data input. For convenience of explanation, only BLE FieldInput 125 is considered. In this case, the status "cursorPos" of BLE page 127 is a unique pointer to the BLE 125. Such a pointer can be implemented as, a unique ID for each BLE. In the survey example, the data path "/survey/planned_costs/travel" serves as unique ID for BLE FieldInput 125. Assuming that the cursor is in BLE 125 when the user submits data 170, for example, the status cursorPos="/survey/planned_costs/ travel" of page 127 is set in a hidden field of individual browser compliant human interface description 160. In the survey example of table 12 (document 160) this is achieved by using a function (e.g. a JavaScript function) (cf. table 12, line 4b) that determines the cursor position and by line 10 of table 12 that transfers the cursor position into a further field instruction of document 160. Preferably, the further input field instruction is for a hidden input field. The content of the further input field instruction is part of data 170. The name attribute "//env:envelope/env:states/uicl:page/@cursorPos" corresponds to a "state"-location (<env:envelope><env: states><uicl:page ... cursorPos= ... >; cf. table 14, line-6) in data instance 150, where value="//survey/planned_costs/ travel" is stored as value attribute cursorPos (cf. table 14, line 7). When individual browser compliant human interface description 160 is re-generated after the submission of data 170, a further function of document 160 (cf. table 12, line 4a) is executed that retrieves the BLE page 127 status information from data instance 150 and sets the cursor position accordingly.

TABLE 14 data instance document 150 after having
stored a layout element status

| Line | Code |
|---|---|
| 1 | <?xml version="1.0" encoding="utf-8"?> |
| 2 | <env:envelope xmlns:env="http://www.sap.com/sapsurvey/env"> |
| 3 | <env:header> |
| 4 | ... |
| 5 | </env:header> |
| 6 | <env:states> |
| 7 | <uicl:page id="survey" cursorPos="//survey/planned_ costs/travel" xmlns:uicl="http://www.sap.com/sapsurvey/ble"/> |
| 8 | ... |
| 9 | </env:states> |
| 10 | <env:body> |
| 11 | ... |
| 12 | </env:body> |
| 13 | </env:envelope> |

In an alternative, preferred embodiment of the present invention, the BLE status can be stored in runtime copy 120-1 of standardized user interface description 120. This alternative embodiment works when the second preferred embodiment of the present invention is used, where method 400 steps 430, 450 are replaced by step 440. This implies the expansion of the runtime environment from method steps 460-490 (cf. FIG. 2) to further comprise method step 440. In this case, using the survey example, BLE status information in data 170 is stored directly in runtime copy 120-1 (cf. table 15, line 2). The status information is preserved during steps decomposing 440, instantiating 460 and merging 470, so that the status is set when rendering 475 human interface 951 at least a second time.

TABLE 15 runtime copy 120-1 of standardized human
interface description document 120 in the survey
example, including status information.

| Line | Code |
|---|---|
| 1 | <?xml version="1.0" encoding="utf-8"?> |
| 2 | <uicl:page id="survey" cursorPos="//survey/planned_costs/travel" xmlns:uicl="http://www.sap.com/sapsurvey/ble"/> |
| 3 | ... |
| 4 | <uicl:Grid rows="1" cols="2" id="planned_costs"> |
| 5 | <uicl:Row visible=" {boolean(//survey/planned_costs/travel) }"> |
| 6 | <uicl:Cell> |
| 7 | <uicl:TextOutput text="Planned travel costs 2002 :"/> |
| 8 | </uicl:Cell> |
| 9 | <uicl:Cell> |
| 10 | <uicl:FieldInput default="0.0" name="//survey/planned_costs/travel"/> |
| 11 | </uicl:Cell> |
| 12 | <uicl:Row> |
| 13 | </uicl:Grid> |
| 14 | </uicl:page> |

Having described the present invention as computer implemented method 400 the invention is now described as computer system 999.

The inventive computer system 999 may automatically create and process a human interface description.

It is assumed that computer 900 (cf. FIG. 1) is the operating computer. A person of skill in the art can implement the invention also in a client-server system, where a server computer (e.g. computer 901, cf. FIG. 1) is used for data processing and a client computer (e.g. computer 900, cf. FIG. 1) serves as a front-end computer with a browser.

An embodiment of computer system 999 may comprise the following means:

a) means for providing 410 (cf. FIGS. 2A-2B) predefined application specific human interface description 110 (cf. FIG. 4); and b) means for transforming 420 (cf. FIGS. 2A-2B) application specific human interface description 110 into standardized human interface description 120 (cf. FIG. 4).

Preferably, means a) comprises a markup language document 110, such as XML (cf. table 2), that further comprises a plurality 111 of ASLEs 112, 113, 114 (cf. FIG. 6). Application specific human interface description document 110, preferably, is stored in memory 920 (cf. FIG. 1) of computer 900.

Preferably, means b) comprises a set of transformation rules to transform ASLEs 112, 113, 114 into BLEs 122, 123, 124-1, 124-2, 125, 126, 127 (cf. FIG. 6) of standardized human interface description 120. For example, the transformation rules are implemented as style sheet language transformation documents (cf. table 3) stored in memory 920. Standardized human interface description 120, preferably, is implemented as a markup language document (cf. table 4) and is also stored in memory 920. Processor 910 processes the transformation rules and applies them to application specific human interface description document 110.

Optionally, in a first preferred embodiment, computer system 999 further comprises means c) to j). The optional means are now explained in detail:

c) means for converting 430 (cf. FIGS. 2A-2B) the standardized human interface description 120 into a browser compliant human interface description 130 (cf. FIG. 4). Preferably, computer 910 may convert document 120 by applying a set of conversion rules that convert BLEs 122, 123, 124-1, 124-2, 125, 126, 127 of document 120 into instructions of a browser compliant markup language of document 130. Preferably, processor 120 may execute the conversion when processing a style sheet language transformation comprising the conversion rules. Resulting document 130 is stored in memory 920.

d) means for decomposing 450 (cf. FIGS. 2A-2B) browser compliant human interface description 130 into human interface layout template 140-1 (cf. FIGS. 5A-5B) and data description 140-2 (cf. FIGS. 5A-5B). Means d), preferably may comprise two style sheet language transformation documents that are applied to document 130 to extract layout template 140-1 and data description 140-2. An example for the style sheet transformation document to extract layout template 140-1 is given in table 9. Preferably, data template 140-1 may be a style sheet language transformation document. The style sheet language transformation document to extract data description 140-2 is described in the detailed description of FIG. 3B. Preferably, processor 910 may process the two style sheet language transformation documents and store the resulting documents 140-1 and 140-2 in memory 920. In this first preferred embodiment of computer system 999 a design-time memory portion of memory 920 may be used because the decomposing step 450 occurs during design-time of human interface 951 (cf. FIG. 6).

e) means for instantiating 460 (cf. FIGS. 2A-2B) data instance 150 (cf. FIG. 7) from data description 140-2;

f) means for merging 470 (cf. FIGS. 2A-2B) data instance 150 with human interface layout template 140-1 into individual browser compliant human interface description 160 (cf. FIG. 7);

g) means for rendering 475 (cf. FIGS. 2A-2B) individual browser compliant human interface description 160 to prompt an user for data input;

h) means for receiving 480 (cf. FIGS. 2A-2B) data 170 (cf. FIG. 7) from the user;

i) means for storing 485 (cf. FIGS. 2A-2B) data 170 in data instance 150; and j) means for storing 490 (cf. FIGS. 2A-2B) a status of at least one basic layout element 122, 123, 124-1, 124-2, 125, 126, 127.

Preferably, means e) comprises a computer program that reads data description 140-2 from memory 920 and creates data instance document 150 in a runtime portion of memory 920 (e.g. a RAM for storing runtime data) by adding runtime dependent data to the data of data description 140-2. Runtime dependent data are created or modified, e.g. by an application program (e.g. 101 on computer 901; cf. FIG. 1 description), during runtime. Table 11 shows an example of data instance 150, which is implemented as a markup language document.

Preferably, means f) comprises layout template 140-1, which is a style sheet language transformation document (cf. table 7) in the example. Processor 910 reads layout template 140-1 from memory 920 and applies it to data instance 150. The result is individual browser compliant human interface description 160 (cf. XHTML example in table 12), which is a markup language document that is stored in a runtime portion of memory 920.

Preferably, means g) comprises a conventional browser program (not shown), such as the Microsoft Internet Explorer or the Netscape Navigator, executed by a processor of a computer (e.g. processor 910 of computer 900). The browser renders browser compliant human interface description 160 and displays the result as human interface 951 on output device 950. Preferably, the human interface 951 prompts a user to input data 170 (cf. FIG. 7) through the human interface 951. The user inputs data via input device 940 (cf. FIG. 1). For example, the user selects a displayed input field in the human interface 951 via a mouse device and enters data via a keyboard.

Preferably, means h) comprises the browser and the basic input/output system (BIOS) of computer 900. The BIOS is receiving signals from input device 940 via bus 930 (cf. FIG. 1). The signals are interpreted as characters and are appropriately displayed by the browser on display device 950. Upon submission of data 170 by the user (e.g. by clicking a submit button with the mouse device), computer 900 receives data 170 via bus 930.

Preferably, means i) is implemented by using a data 170 format according to table 13 and a storage program. The storage program automatically stores the data 170 in the runtime memory portion of memory 920 that belongs to data instance 150. The exact storage address is derived from the XPath in the name of each data set of table 13.

Preferably, means j) is implemented by using JavaScript functions and a hidden field in document 160 (Cf. Table 12). A JavaScript function determines the status of at least one basic layout element 122, 123, 124-1, 124-2, 125, 126, 127 and stores the status in the hidden field. The hidden field becomes part of submitted data 170 and is stored by the storage program in data instance 150 (cf. table 14, line 7) together with other data sets of data 170. Like other data sets of data 170, the status also comprises a name with the XPath that corresponds to the exact storage address.

In a second preferred embodiment of computer system 999 optional means c) and d) are replaced by optional means k) for decomposing 440 standardized human interface description 120 into human interface layout template 140-1 and a data description 140-2. Preferably, means k) is implemented as two style sheet language transformation documents that are applied to document 120 to extract layout template 140-1 and data description 140-2. An example for the style sheet transformation document to extract layout template 140-1 is given in table 6. Preferably, data template 140-1 is a style sheet language transformation document. The style sheet language transformation document to extract data description 140-2 is described in the detailed description of FIG. 3A. Preferably, processor 910 processes the two style sheet language transformation documents and stores the resulting documents 140-1 and 140-2 in memory 920. In this second preferred embodiment of computer system 999 a design-time memory portion of memory 920 is used because the decomposing step 450 occurs during design-time of human interface 951 (cf. FIG. 6).

In an alternative preferred embodiment of computer system 999, runtime processing is extended to further comprise means b) and k). To achieve this, computer system 999 creates a runtime copy 120-1 (cf. FIG. 7) of standardized human interface description 120 as a further part of means b). Preferably, runtime copy 120-1 is stored in a runtime memory portion of memory 920. In this case, the decomposing means k) accesses runtime copy 120-1 instead of document 120 to extract layout template 140-1 and data description 140-2, which are both also stored in a runtime memory portion of memory 920. In this alternative embodiment, means j) stores 490 the at least one status data set of data 170 in runtime copy 120-1 instead of data instance 150 (cf. dashed lines in FIG. 7; table 15, line 2). The decomposing means k) then extracts the status data into data description 140-2 and creates a corresponding link in layout template 140-1.

Having described the present invention as computer implemented method 400 and computer system 999, it is now described as a computer program product. Computer program product 100 has a plurality of instructions for causing a processor (e.g. processor 910) of a computer (e.g. computer 900) to create and process a human interface description. Computer program product 100 causes computer 900 to execute the following steps:

Computer program product 100 has may have a plurality of instructions for causing a processor (e.g., processor 910) of a computer (e.g., computer 900) to create and process a human interface description. Computer program product 100 may cause computer 900 to execute the following steps:

a) providing 410 predefined application specific human interface description 110; and b) transforming 420 application specific human interface description 110 into standardized human interface description 120.

In a first preferred embodiment, computer program product 100 causes computer 900 to execute the further optional steps c) to j):

c) converting 430 standardized human interface description 120 into browser compliant human interface description 130;

d) decomposing 450 browser compliant human interface description 130 into human interface layout template 140-1 and data description 140-2;

e) instantiating 460 data instance 150 from data description 140-2;

f) merging 470 data instance 150 with human interface layout template 140-1 into individual browser compliant human interface description 160;

g) rendering 475 individual browser compliant human interface description 160 to prompt an user for data input;

h) receiving 480 data 170 from the user;

i) storing 485 data 170 in data instance 150; and j) storing 490 a status of at least one basic layout element 122, 123, 124-1, 124-2, 125, 126, 127.

Computer program 100 steps a) to j) may be equivalent to method 400 steps a) to j), respectively, that are described in detail under FIGS. 2, 3 and 7.

In a second preferred embodiment, computer program product 100 causes computer 900 to execute optional step k) instead of steps c) and d):

k) decomposing 440 standardized human interface description 120 into human interface layout template 140-1 and data description 140-2.

Computer program 100 step k) may be equivalent to method 400 step k) described in detail under FIGS. 2 and 3.

Reference number table

| Reference | Description |
|---|---|
| 100, 101, 102 | Computer program products |
| 111 | Plurality of ASLEs |
| 121 | Plurality of BLEs |
| 112, 113, 114 | ASLEs |
| 114-1 to 114-4 | ASLE attributes |
| 122, 123, 124-1, 124-2, 125, 126, 127 | BLEs |
| 110 | Application specific human interface description |
| 120 | Standardized human interface description |
| 120-1 | Runtime copy of 120 |
| 130 | Browser compliant human interface description |
| 140-1 | Layout template |
| 140-2 | Data description |
| 150 | Data instance |
| 155 | Application interface |
| 160 | Individual browser compliant human interface description |
| 170 | Data |
| 400 | Method |
| 4xx | Method steps |
| 999 | Computer network system |
| 900, 901, 902 | Computers |
| 910, 911, 912 | Processors |
| 920, 921, 922 | Memories |
| 930 | Bus |
| 940 | Input device |
| 950 | Output device |
| 951 | Cursor |
| 960 | User interface |
| 970 | Program/data carrier (computer readable device) |
| 980 | Program signal |

The invention claimed is:

1. A computer-implemented method for creating and processing a human interface description, the method comprising the steps of:

receiving an application-specific human interface description associated with an information-gathering application, the application-specific human interface description comprising:

application-specific layout elements defined according to terminology consistent with the application, the application-specific layout elements being arranged in an expandable and collapsible hierarchy having a corresponding hierarchical state; and data elements defined according to the terminology and having values specific to the application;

transforming the application-specific human interface description into a standardized human interface description, the standardized human interface description comprising standardized layout information and the data elements specific to the application, the transforming comprising:

translating the application-specific layout elements into the standardized layout information, the standardized layout information comprising layout elements in a format independent of the application and independent of a browser, wherein the standardized layout information maintains the hierarchical state of the application-specific layout elements;

decomposing the standardized human interface description into a human interface layout template and a data description, the data description comprising the data elements specific to the application, and the human interface layout template comprising the standardized layout information, the decomposing comprising:

extracting the standardized layout information from the standardized human interface description using a first transformation; and extracting the data elements specific to the application from the standardized human interface description using a second transformation, wherein the second transformation scans the standardized human interface description to identify name attributes, and at least one of the data elements specific to the application and corresponding to the identified name attributes; and merging a data instance of the data description with the human interface layout template to form an individual browser-compliant human interface description, the merging comprising translating the layout information into a format consistent with the browser.

2. The method of claim 1, wherein the application-specific human interface description is a markup language description.

3. The method of claim 1, wherein the standardized human interface description is a markup language description.

4. The method of claim 1, wherein the transforming comprises performing a transformation using a style sheet.

5. The method of claim 1, wherein the first transformation and the second transformation are performed using a single style sheet.

6. The method of claim 1, further comprising the steps of:
instantiating a data instance from the data description;
receiving data from a user; and
storing the data in the data instance.

7. The method of claim 6, further comprising:
storing a status of a one basic layout element in response to the received data, wherein the status reflects a position of the user within the individual browser-compliant human interface description.

8. The method of claim 1, wherein the merging comprises performing a transformation using a style sheet.

9. The method of claim 1, wherein the received data comprises a XPath.

10. The method of claim 1, wherein the application-specific layout elements are named according to the application.

11. A computer system for creating and processing a human interface description, the computer system comprising:

means for receiving an application-specific human interface description associated with an information-gathering application, the application-specific human interface description comprising:

application-specific layout elements defined according to terminology consistent with the application, the application-specific layout elements being arranged in an expandable and collapsible hierarchy having a corresponding hierarchical state; and data elements defined according to the terminology and having values specific to the application;

means for transforming the application-specific human interface description into a standardized human interface description, the standardized human interface description comprising standardized layout information and the data elements specific to the application, the transforming comprising:

translating the application-specific layout elements into the standardized layout information, the standardized layout information comprising layout elements in a format independent of the application and independent of a browser, wherein the standardized layout information maintains the hierarchical state of the application-specific layout elements;

means for decomposing the standardized human interface description into a human interface layout template and a data description, the data description comprising the data elements specific to the application, and the human interface layout template comprising the standardized layout information, the means for decomposing comprising:

means for extracting the standardized layout information from the standardized human interface description using a first transformation; and means for extracting the data elements specific to the application from the standardized human interface description using a second transformation, wherein the second transformation scans the standardized human interface description to identify name attributes, and at least one of the data elements specific to the application and corresponding to the identified name attributes; and means for merging a data instance of the data description with the human interface layout template to form an individual browser-compliant human interface description, the merging comprising translating the layout information into a format consistent with the browser.

12. The computer system of claim 11, further comprising:
means for instantiating a data instance from the data description;
means for receiving data from a user; and
means for storing the data in the data instance.

13. The computer system of claim 12, further comprising:
means for storing a status of a one basic layout element in response to the received data, wherein the status reflects a position of the user within the individual browser-compliant human interface description.

14. The computer system of claim 11, wherein the application-specific layout elements are named according to the application.

15. The computer system of claim 11, further comprising means for converting the standardized human interface description into the browser-compliant human interface description when the browser-compliant human interface description is decomposed.

16. The computer system of claim 15, wherein the converting comprises performing a transformation using a style sheet.

17. A computer-readable medium which stores a set of instructions which, when executed on a processor, perform a method for creating and processing a human interface description, the method comprising:

receiving an application-specific human interface description associated with an information-gathering application, the application-specific human interface description comprising:

application-specific layout elements defined according to terminology consistent with the application, the application-specific layout elements being arranged in an expandable and collapsible hierarchy having a corresponding hierarchical state; and data elements defined according to the terminology and having values specific to the application;

transforming the application-specific human interface description into a standardized human interface description, the standardized human interface description comprising standardized layout information and the data elements specific to the application, the transforming comprising:

translating the application-specific layout elements into the standardized layout information, the standardized layout information comprising layout elements in a format independent of the application and independent of a browser, wherein the standardized layout information maintains the hierarchical state of the application-specific layout elements;

decomposing the standardized human interface description into a human interface layout template and a data description, the data description comprising the data elements specific to the application, and the human interface layout template comprising the standardized layout information, the means for decomposing comprising:

extracting the standardized layout information from the standardized human interface description using a first transformation; and extracting the data elements specific to the application from the standardized human interface description using a second transformation, wherein the second transformation scans the standardized human interface description to identify name attributes, and at least one of the data elements specific to the application and corresponding to the identified name attributes; and merging a data instance of the data description with the human interface layout template to form an individual browser-compliant human interface description, the merging comprising translating the layout information into a format consistent with the browser.

18. The computer-readable medium of claim 17, the method further comprising:
instantiating a data instance from the data description;
receiving data from a user; and
storing the data in the data instance.

19. The computer-readable medium of claim 18, wherein the method further comprises:
storing a status of a one basic layout element in response to the received data, wherein the status reflects a position of the user within the individual browser-compliant human interface description.

20. The computer-readable medium of claim 17, wherein the application-specific layout elements are named according to the application.

21. The computer-readable medium of claim 17, wherein the method further comprises converting the standardized human interface description into the browser-compliant human interface description when the browser-compliant human interface description is decomposed.

22. The computer-readable medium of claim 21, wherein the converting comprises performing a transformation using a style sheet.

23. A computer-implemented method for creating and processing a human interface description for an underlying application, the method comprising:
- receiving an application-specific human interface description associated with an information-gathering application, the application-specific human interface description comprising:
  - application-specific layout elements defined according to terminology consistent with the application, the application-specific layout elements being arranged in an expandable and collapsible hierarchy having a corresponding hierarchical state; and
  - data elements defined according to the terminology and having values specific to the application;
- transforming the application-specific human interface description into a standardized human interface description, the standardized human interface description comprising standardized layout information and the data elements specific to the application, the transforming comprising:
  - translating the application-specific layout elements into the standardized layout information, the standardized layout information comprising basic layout elements in a format independent of the application and independent of a browser, wherein the standardized layout information maintains the hierarchical state of the application-specific layout elements;
- converting the standardized human interface description into a browser-compliant human interface description;
- receiving, from a user, information specific to the application;
- refining a data element of the browser-compliant human interface description according to the received information, wherein the refined browser-compliant human interface description comprises the data elements specific to the application and the standardized layout information independent of the underlying application; and
- decomposing the refined browser-compliant human interface description into a human interface layout template and a data description, the data description comprising the data elements specific to the application, and the human interface layout template comprising the standardized layout information, the decomposing comprising:
  - extracting the standardized layout information from the browser compliant human interface description using a first transformation; and
  - extracting the data elements specific to the application from the browser-compliant human interface description using a second transformation, wherein the second transformation scans the browser compliant human interface to identify name attributes, and at least one of the data elements specific to the application and corresponding to the identified name attributes.

24. The method of claim 23, wherein the first transformation and the second transformation are performed using a single style sheet.

25. The method of claim 23, further comprising the steps of:
- instantiating a data instance from the data description;
- receiving data from a user; and
- storing the data in the data instance.

26. The method of claim 23, wherein the merging comprises performing a transformation using a style sheet.

27. The method of claim 23, wherein the received data comprises a XPath.

* * * * *